United States Patent
Daya et al.

(10) Patent No.: US 12,546,241 B2
(45) Date of Patent: Feb. 10, 2026

(54) SYSTEMS AND METHODS FOR PREDICTING AND CONTROLLING TAILPIPE NOx CONVERSION AND AMMONIA SLIP BASED ON DEGRADATION OF AN AFTERTREATMENT SYSTEM

(71) Applicant: Cummins Inc., Columbus, IN (US)

(72) Inventors: Rohil Daya, Columbus, IN (US);
Anand Srinivasan, Greenwood, IN (US); Karthik Venkata Rama Krishna Dadi, Columbus, IN (US); Saurabh Yashwant Joshi, Austin, TX (US); Michael J. Cunningham, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/729,498

(22) PCT Filed: Jan. 20, 2023

(86) PCT No.: PCT/US2023/011273
§ 371 (c)(1),
(2) Date: Jul. 16, 2024

(87) PCT Pub. No.: WO2023/141293
PCT Pub. Date: Jul. 27, 2023

(65) Prior Publication Data
US 2025/0172083 A1    May 29, 2025

Related U.S. Application Data

(60) Provisional application No. 63/301,808, filed on Jan. 21, 2022.

(51) Int. Cl.
*F01N 3/20*    (2006.01)
*B01D 53/34*    (2006.01)
(Continued)

(52) U.S. Cl.
CPC .......... *F01N 3/208* (2013.01); *B01D 53/346* (2013.01); *B01D 53/9431* (2013.01);
(Continued)

(58) Field of Classification Search
CPC combination set(s) only.
See application file for complete search history.

(56) References Cited

U.S. PATENT DOCUMENTS 8,141,340 B2    3/2012    Garimella et al.
8,834,820 B1    9/2014    Mowers et al.
(Continued)

FOREIGN PATENT DOCUMENTS

CN    108343497 B    7/2018
CN    110552766 A    12/2019

OTHER PUBLICATIONS

International Search Report and Written Opinion for International Patent Application No. PCT/US2023/011273, issued Jun. 16, 2023, 19 pages.
(Continued)

*Primary Examiner* — Binh Q Tran
(74) *Attorney, Agent, or Firm* — Foley & Lardner LLP

(57) ABSTRACT

A system, method, and apparatus for predicting and controlling tailpipe NOx conversion and ammonia slip based on degradation of an aftertreatment system. The aftertreatment system is coupled to a controller. The controller can be configured to retrieve, from a memory, a model of a catalyst of the aftertreatment system. The model can be generated based on at least historical data from at least one sensor upstream of the catalyst and at least one sensor downstream of the catalyst. The controller predicts, using the model, a first value to be sensed by the sensor upstream of the catalyst and a second value to be sensed by the sensor downstream
(Continued)

of the catalyst. The controller controls reductant dosing from a doser based on the predicted second value.

20 Claims, 17 Drawing Sheets

(51) Int. Cl.
  *B01D 53/94* (2006.01)
  *F01N 9/00* (2006.01)
  *F01N 11/00* (2006.01)
(52) U.S. Cl.
  CPC ...... *B01D 53/9418* (2013.01); *B01D 53/9422* (2013.01); *B01D 2258/01* (2013.01); *F01N 9/005* (2013.01); *F01N 11/005* (2013.01); *F01N 2560/025* (2013.01); *F01N 2560/026* (2013.01); *F01N 2610/146* (2013.01); *F01N 2900/0406* (2013.01); *F01N 2900/0412* (2013.01); *F01N 2900/0416* (2013.01); *F01N 2900/1402* (2013.01)

(56) References Cited

U.S. PATENT DOCUMENTS

| | | | |
|---|---|---|---|
| 10,738,671 | B2 | 8/2020 | Gupta et al. |
| 11,549,418 | B1* | 1/2023 | Ratts ............... F01N 3/0885 |
| 2003/0216855 | A1* | 11/2003 | Liang ............... F01N 13/0097 |
| | | | 701/114 |
| 2004/0098974 | A1 | 5/2004 | Nieuwstadt et al. |
| 2005/0108927 | A1 | 5/2005 | Velappan et al. |
| 2010/0024397 | A1 | 2/2010 | Chi et al. |
| 2010/0083636 | A1* | 4/2010 | Wang ............... F01N 3/2066 |
| | | | 60/277 |
| 2011/0219747 | A1 | 9/2011 | Geveci et al. |
| 2012/0067028 | A1 | 3/2012 | Clerc et al. |
| 2015/0143884 | A1* | 5/2015 | Heaton ............... F01N 3/2066 |
| | | | 73/114.75 |
| 2017/0122159 | A1 | 5/2017 | Bahrami |
| 2019/0292970 | A1* | 9/2019 | Ikedo ............... F01N 3/101 |
| 2023/0003152 | A1* | 1/2023 | Clerc ............... F01N 11/002 |

OTHER PUBLICATIONS

Wei et al. "Nox conversion efficiency optimization based on NSGA-II and state-feedback nonlinear model predictive control of selective catalytic reduction system in diesel engine." Applied Energy 206 (2017): 959-971. Retrieved on May 5, 2023 (May 5, 2023) from https://kd.nsfc.gov.cn/paperDownload/ZD2126818.pdf.

Extended Search Report issued for European Patent Application No. EP 23 74 3777 issued Oct. 21, 2025, 9 pages.

* cited by examiner

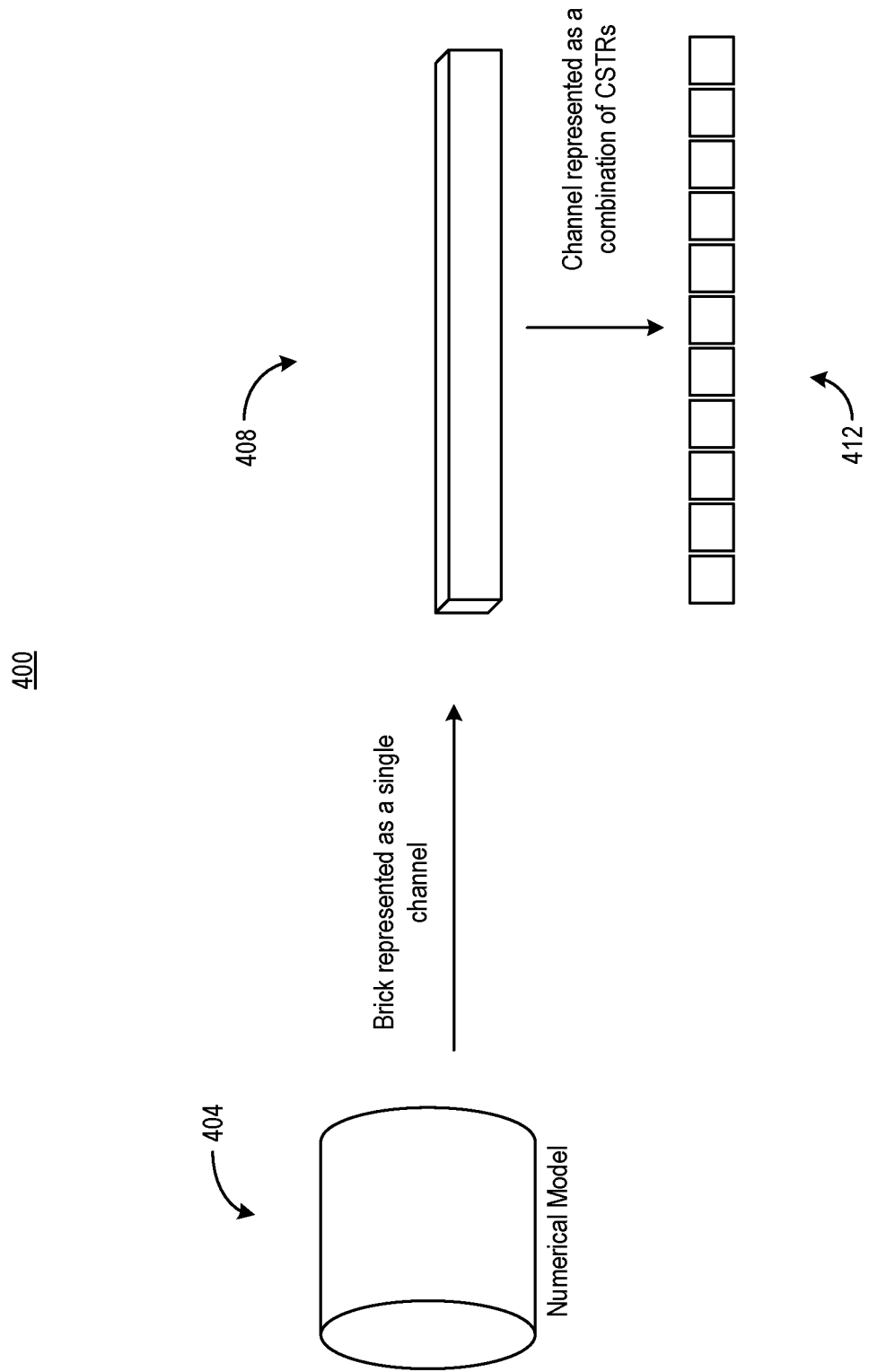

SYSTEMS AND METHODS FOR PREDICTING AND CONTROLLING TAILPIPE NOx CONVERSION AND AMMONIA SLIP BASED ON DEGRADATION OF AN AFTERTREATMENT SYSTEM

CROSS-REFERENCE TO RELATED APPLICATIONS

This application is a U.S. National Stage Application of International Application No. PCT/US2023/011273, filed Jan. 20, 2023, titled "SYSTEMS AND METHODS FOR PREDICTING AND CONTROLLING TAILPIPE NOX CONVERSION AND AMMONIA SLIP BASED ON DEGRADATION OF AN AFTERTREATMENT SYSTEM," which claims the benefit of and priority to U.S. Provisional Application No. 63/301,808, filed Jan. 21, 2022, titled "SYSTEMS AND METHODS FOR PREDICTING AND CONTROLLING TAILPIPE NOX CONVERSION AND AMMONIA SLIP BASED ON DEGRADATION OF AN AFTERTREATMENT SYSTEM," all of which are incorporated herein by reference in their entireties and for all purposes.

TECHNICAL FIELD

The present disclosure relates to exhaust aftertreatment systems. More particularly, the present disclosure relates to predicting and controlling reductant dosing of an aftertreatment system based on real-world degradation of the aftertreatment system.

BACKGROUND

Emission regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Consequently, using exhaust aftertreatment systems to reduce engine emissions is desirable. Exhaust aftertreatment systems can include various catalysts (e.g., a selective catalytic reduction system, a diesel oxidation catalyst, etc.), and, among other components or systems, reductant dosing systems that introduce a reductant (e.g., urea, diesel exhaust fluid (DEF), ammonia solutions, etc.) to reduce nitrogen oxide (NOx) emissions from the system. With emissions regulations expected to become more stringent in the coming years, it is desirable to have a robust control scheme/solution that functions to effectively and for an extended period of time mitigation certain exhaust gas constituent emissions.

SUMMARY

In some aspects, this disclosure is directed to a system, method, or apparatus for predicting and controlling tailpipe nitrogen oxides (NOx) conversion and ammonia (NH3) slip based on the degradation of an aftertreatment system. The system, method, or apparatus can include an aftertreatment system. The aftertreatment system can be coupled to a controller. The controller can retrieve a model of a catalyst of the aftertreatment system from a memory. The model may be generated based on at least historical data from at least one sensor upstream of the catalyst and at least one sensor downstream of the catalyst. The controller can predict, using the model, a first value to be sensed by the sensor upstream of the catalyst and a second value to be sensed by the sensor downstream of the catalyst. The controller can control reductant dosing from a doser based on the predicted second value.

The controller can receive the first value sensed from the sensor upstream of the catalyst. The controller can predict, using the model, based on the sensed first value, the second value to be sensed by the sensor downstream of the catalyst. The controller can control the reductant dosing from the doser based on the predicted second value. The first value may be indicative of an amount of nitrogen oxides (NOx) upstream of the catalyst. The second value may be indicative of an amount of NOx downstream of the catalyst. In some cases, the second value may be indicative of an amount of the reductant downstream of the catalyst The historical data from the sensor upstream of the catalyst can include at least temperature data, flow data, fuel consumption data, and prediction data. The prediction data can include at least one of NOx data or Oxygen (O2) data. In some cases, the historical data can include an operation time of the catalyst, a number of regenerations of the catalyst, a plurality of values from the sensor upstream of the catalyst during the operation time, and a plurality of values from the sensor downstream of the catalyst during the operation time.

The controller may increase the reductant dosing from the doser in response to the operation time being greater than a first threshold. The controller may increase the reductant dosing from the doser in response to a number of regenerations being greater than a second threshold. The controller may decrease, in response to a regeneration of the catalyst, the reductant dosing from the doser based on the operation time and the number of regenerations of the catalyst. In some cases, the controller can initiate, in response to the operation time of the catalyst exceeding a threshold, a process to recover the catalyst. The controller can adjust, in response to recovering the catalyst, the model to predict a third value to be sensed by the sensor downstream from the catalyst.

The catalyst may be a Selective Catalytic Reduction (SCR) catalyst. The model can include a channel based on the catalyst comprising a plurality of sections. The controller can predict, for each of the plurality of sections of the channel, a value of a continuously stirred tank reactor (CSTR). The value may be indicative of conversion between NOx and ammonia (NH3) based on the historical data. The controller can determine a state of the catalyst based on the plurality of sections of the channel. The controller can predict, based on the state of the catalyst, the second value to be sensed by the sensor downstream of the catalyst.

The controller can control the reductant dosing from the doser at a future time period based on the predicted second value. The controller can identify, at the future time period subsequent to controlling the reductant dosing, a third value sensed by the sensor downstream of the catalyst. The controller can adjust, based on at least the historical data and a comparison between the third value to a threshold, the model to control the reductant dosing from the doser to satisfy the threshold.

In some aspects, a method is provided. The method includes: retrieving, by a controller coupled to an aftertreatment system and from a memory, a model of a catalyst of the aftertreatment system generated based on at least historical data from at least one sensor upstream of the catalyst and at least one sensor downstream of the catalyst; predicting, by the controller using the model, a first value sensed by the sensor upstream of the catalyst and a second value sensed by the sensor downstream of the catalyst; and controlling, by the controller, reductant dosing from a doser based on the predicted second value.

In some other aspects, a system is provided. The system includes at least one processing circuit comprising at least one memory coupled to at least one processor. The at least one processing circuit is configured to: predict, using a model of a catalyst of an aftertreatment system generated based on at least historical data from at least one sensor upstream of the catalyst and at least one sensor downstream of the catalyst, a first value sensed by the sensor upstream of the catalyst and a second value sensed by the sensor downstream of the catalyst; receive a third value sensed by the sensor downstream of the catalyst; determine a fault with a doser responsive to a comparison between the second value and the third value exceeding a threshold; and, provide, responsive to the determination, an indication of the fault to an operator device.

These and other features, together with the organization and manner of operation thereof, will become apparent from the following detailed description when taken in conjunction with the accompanying drawings. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIG. 4A is an example illustration of a model that may be included within the controller of FIGS. 1-2 and is represented by various continuously stirred tank reactors (CSTRs), according to an example embodiment.

DETAILED DESCRIPTION

Figure 1:
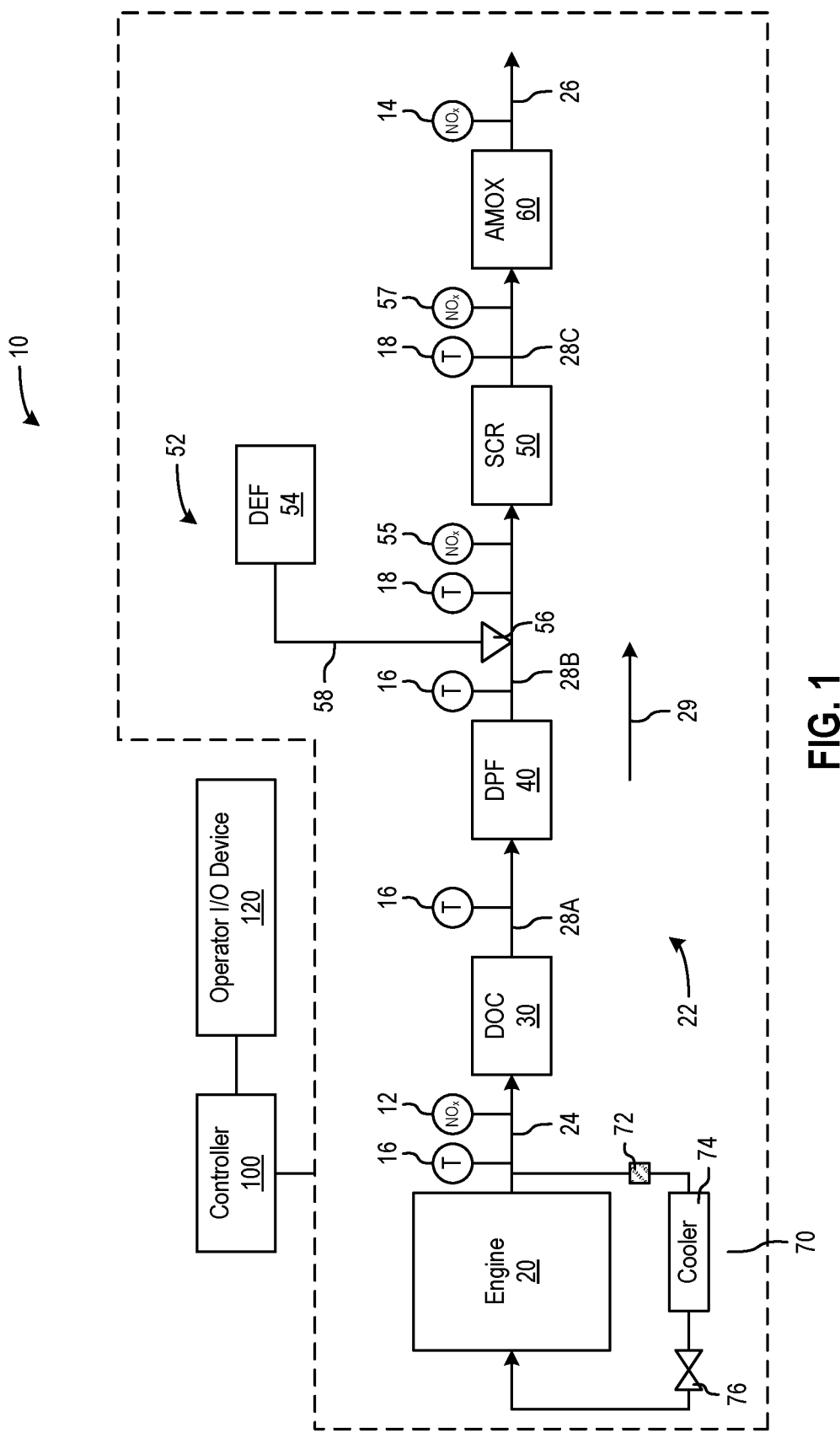
FIG. 1 is schematic diagram of an exhaust aftertreatment system coupled to a controller, according to an example embodiment.

Following below are more detailed descriptions of various concepts related to, and implementations of, methods, apparatuses, and systems for predicting and controlling tailpipe NOx conversion, other emissions, and aftertreatment system operation based on degradation of the aftertreatment system. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for controlling one or more components of an exhaust aftertreatment system based on a prediction of NOx conversion and ammonia (NH3) slip as a function of a degradation of the aftertreatment system. The system includes a controller coupled to an exhaust gas aftertreatment system that includes a selective catalytic reduction (SCR) system (which may include a SCR catalyst), a reductant dosing system structured to introduce or dose a reductant into an exhaust gas stream, and an exhaust gas recirculation (EGR) system. Upon introducing or dosing an amount of reductant into the exhaust gas stream, the SCR system performs a chemical reaction to convert NOx emissions from the exhaust gas aftertreatment system to less harmful compounds due to the reaction with the catalyst of the SCR and the reductant (e.g., into water, etc.).

The reductant dosing can be controlled by the controller based on one or more measured or estimated quantities, such as engine-out NOx, SCR temperature, exhaust flow rate, and/or others. To optimize the dosing strategy of the reductant, the controller can determine a state of the catalyst, such as the SCR catalyst. The state of the catalyst, which in this instance is the SCR catalyst, may be representative of at least one of an ammonia storage capacity or a NOx conversion value (e.g., a NOx conversion efficiency). The conversion efficiency can be based on or a function of at least the temperature of the SCR catalyst, exhaust flow rate, or engine-out NOx. As described herein, the state of the SCR catalyst can evolve over time due to prolonged thermal and chemical exposure, which can result in the deactivation of the catalyst. Hence, it can be challenging to optimize NOx conversion while minimizing ammonia slip due to the evolving state of the SCR catalyst.

The systems, methods, and apparatuses of this technical solution can provide a model (e.g., physics-based electronic control module (ECM) embedded plant model) of the catalyst to predict the state and behavior of the catalyst as a function of real-world aging. The controller coupled to the aftertreatment system can use the model to predict the state of the catalyst as a function of the aging of the catalyst. The controller can retrieve the model (e.g., from a database generated by a remote device) or generate the model locally. For instance, the controller can use the model to determine at least the NH3 surface coverage of the SCR, the tailpipe NOx, and the NH3 slip based on the state of the SCR. To determine the state of the SCR, the controller can provide input data or conditions to the model, such as engine-out NOx (e.g., virtual sensor or physical sensor), exhaust flow rate, and aftertreatment inlet temperature to the model. The controller can provide other boundary conditions to the model to determine the state of the model.

The controller can use or consider the diesel oxidation catalyst (DOC) kinetics to determine the ratio between the SCR-inlet nitrogen dioxide (NO2) and NOx via the model. Following the DOC, the controller can determine the state of the SCR based on the model. For example, the model can utilize at least the ratio between NO2 and NOx, and the reductant dosing rate to determine the state of the SCR. The state of the SCR can represent at least one of a temperature, a NH3 coverage, an ammonium nitrate (AN) coverage, and an output value (e.g., the gas concentration of nitric oxide (NO), NO2, NH3, and N2O) of the SCR. In some cases, the model may consider the ammonia oxidation catalyst (AMOX) effects through a reduced-order model of the dual-layer catalyst.

The controller can use the NH3 slip and NH3 surface coverage prediction based on the model for reductant dosing control. For instance, the controller can maximize or substantially maximize a surface coverage of NH3 to improve NOx conversion efficiency within a threshold NH3 slip tolerance (e.g., 15 parts-per-million (ppm), 12 ppm, 10 ppm, etc.). The controller can use the model to track the formation of N2O. Based on the formation of the N2O, the controller can mitigate tailpipe N2O slip by minimizing ammonium nitrate surface coverage. For example, since ammonium nitrate formation requires conditions, such as low temperature, NH3, and NO2 availability, the controller can minimize the ammonium nitrate surface coverage by at least one of i) increasing SCR operating temperature above a certain threshold (e.g., 200 Celsius) (e.g., via activation of an exhaust aftertreatment system heater), ii) decreasing the reductant dosing rate (e.g., via control of a reductant doser), and/or iii) decreasing NH3 availability to the SCR catalyst.

The controller can compare the modeled outlet NOx predictions to tailpipe NOx sensor measurements (e.g., via an extended Kalman filter). The NOx sensor measurements may be corrected for cross-sensitivity. The controller can compare the predicted output to the measured output to update or enhance the accuracy of the model. In one embodiment, a Kalman filter is used by the controller. The Kalman filter may be nonlinear, where the nonlinear state equations and covariance propagation model can be linearized about each new state and covariance estimation. The controller can aggregate the tailpipe NOx measurement with other data from the model to optimize NH3 storage and NOx conversion efficiency.

In operation, the catalyst (e.g., SCR catalyst) is exposed to high temperatures and chemical poisons, such as sulfur in fuel, such that the catalyst may experience reversible and irreversible deactivation. For example, reversible deactivation can include one or more portions of the catalyst that can be recovered from being sulfated, which can lead to low NOx conversion efficiency (e.g., below a predefined threshold). The recovery process may be referred to as desulfation (DeSOx). Through DeSOx, the catalyst may experience irreversible deactivation overtime at one or more portions of the catalyst. As described herein, the controller can adjust or improve the model to account for these real-world catalyst deactivation effects. For example, the model can monitor the effects of deactivation through fuel consumption and temperature inputs. The deactivation of the catalyst can be associated with the degradation of the catalyst (e.g., the model can monitor the degradation of the catalyst). The degradation of the catalyst can include at least a decrease in the NOx conversion ability or an increase in NH3 slip based on progressive aging.

Additionally, the controller can use age-based modifications to the individual active sites densities (e.g., regions where the substrate binds or catalysis occurs) in the model in aging adaptation for reductant dosing configuration. The controller can calculate the final urea dosing value upon adaptation to the aging of the catalyst. Accordingly, the controller can increase or decrease the reductant dosing based on reduced NH3 storage capacity over time upon catalyst deactivation, for instance, as a result of aging.

In some implementations, the model can provide feedback representing the functionalities of the reductant dosing control. The controller can use the model to identify the root cause for NOx reduction catalyst degradation. In some cases, the controller can identify the cause of NOx reduction catalyst to be an increase in the sulfur content of the fuel. The increase in the sulfur content of the fuel can increase the rate of deactivation estimated by the model, thereby leading to decreased NOx conversion efficiency with increased NH3 slip. As the model can distinguish NOx slip and NH3 slip, the controller can utilize the model to diagnose failures in exhaust-gas sensors utilized for estimating NOx and NH3 concentrations.

In some implementations, the controller can utilize the model to guide the hydrocarbon dosing during the active regeneration of a particulate filter. The particulate filter can trap particulate matter along the gas exhaust stream of the aftertreatment system. The controller can determine a threshold deactivation level caused by reversible sulfur poisoning. The threshold can be based on at least predefined NOx conversion values, such as 70%, 75%, or 80%. The controller can trigger, in response to the deactivation level reaching the threshold, a hydrocarbon dosing event that increases the catalyst temperature (e.g., to approximately 425° C.) for desorption of weakly bound sulfur. By increasing the catalyst temperature for desorption, the controller can recover the NOx conversion performance of the catalyst. Further, by setting a threshold deactivation level, the controller can optimize the frequency and duration of the active regenerations to minimize the irreversible deactivation of the NOx reduction catalyst. The deactivation level can include or correspond to a degradation level of the catalyst, such as the degradation in NOx conversion ability. The threshold deactivation level can represent a point during the deactivation process (e.g., deactivated percentage or value)

when the controller should regenerate the catalyst. The controller can track the real-world deactivation mechanisms (e.g., effects of catalyst deactivation resulting in irreversible deactivation) in the model to set the threshold deactivation level, which can be associated with the frequency and duration to perform the active regenerations.

In some implementations, the controller can use predictions from the model as feedback data to improve and optimize engine operation. For example, the controller can receive an indication of an increased or decreased engine-out NOx value in response to determining the state of the NOx reduction catalyst using the model. Based on the engine-out NOx value, the controller can optimize fuel consumption and reductant dosing consumption by identifying appropriate engine operating points in response to catalyst degradation. The appropriate engine operating points can include one or more operating conditions (e.g., engine speed, load, etc.) that provide at least optimal fuel consumption and/or reductant dosing consumption based on the model prediction(s) of catalyst deactivation. Accordingly, the systems, methods, and apparatuses of this technical solution provide a controller structured to optimize reductant dosing, improve NOx conversion, minimize NH3 slip, and minimize irreversible deactivation based on catalyst aging.

Referring now to FIG. 1 and as shown, a schematic diagram of an exhaust aftertreatment system with a controller 100 is shown according to an example embodiment. The system 10 is shown as an engine-exhaust aftertreatment system. The system 10 includes an internal combustion engine 20 coupled to an exhaust aftertreatment system 22 that is in exhaust gas-receiving communication with the engine 20. A controller 100 is coupled to the system along with an operator input/output (I/O) device 120. The system 10 may be embodied in a vehicle. The vehicle may include an on-road or an off-road vehicle including, but not limited to, line-haul trucks, mid-range trucks (e.g., pick-up trucks), cars, boats, tanks, airplanes, locomotives, mining equipment, and any other type of vehicle. The vehicle may include a transmission, a fueling system, one or more additional vehicle subsystems, etc. The vehicle may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset.

In the example shown, the engine 20 is an internal combustion engine that is structured as a compression-ignition internal combustion engine that utilizes diesel fuel. In various other embodiments, the engine 20 may be structured as any other type of engine (e.g., spark-ignition) that utilizes any type of fuel (e.g., gasoline, natural gas, etc.). Within the internal combustion engine 20, air from the atmosphere is combined with fuel and combusted to power the engine. Combustion of the fuel and air in the compression chambers of the engine 20 produces exhaust gas that is operatively vented to an exhaust manifold (not shown) and to the aftertreatment system 22.

In still other embodiments, the vehicle may be another type of vehicle, such as a hybrid vehicle containing one or more electric motors, a fuel cell vehicle, and so on. Thus, while the engine 20 is structured as a diesel-powered internal combustion engine herein, other embodiments are contemplated to fall within the scope of the present disclosure.

The exhaust aftertreatment system 22 includes a diesel particulate filter (DPF) 40, a diesel oxidation catalyst (DOC) 30, a selective catalytic reduction (SCR) system 52 with an SCR catalyst 50, an ammonia oxidation (AMOx) catalyst 60, and an exhaust gas recirculation (EGR) system 70. The SCR system 52 further includes a reductant delivery system that has a diesel exhaust fluid (DEF) source 54 that supplies DEF to a DEF doser 56 via a DEF line 58.

In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC into a first section of exhaust piping 28A. From the first section of exhaust piping 28A, the exhaust gas flows into the DPF 40 and exits the DPF into a second section of exhaust piping 28B. From the second section of exhaust piping 28B, the exhaust gas flows into the SCR catalyst 50 and exits the SCR catalyst into the third section of exhaust piping 28C. As the exhaust gas flows through the second section of exhaust piping 28B, it is periodically dosed with DEF by the DEF doser 56. Accordingly, the second section of exhaust piping 28B acts as a decomposition chamber or tube to facilitate the decomposition of the DEF to ammonia. From the third section of exhaust piping 28C, the exhaust gas flows into the AMOx catalyst 60 and exits the AMOx catalyst into outlet piping 26 before the exhaust gas is expelled from the system 22. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOx catalyst 60. However, in alternative embodiments, other arrangements of the components of the exhaust aftertreatment system 22 are also possible.

The DOC 30 may be structured to have any number of different types of flow-through designs. The DOC 30 may be structured to oxidize at least some particulate matter in the exhaust (e.g., the soluble organic fraction of soot) and reduce unburned hydrocarbons and CO in the exhaust to less environmentally harmful compounds. For example, the DOC 30 may be structured to reduce the hydrocarbon and CO concentrations in the exhaust to meet the requisite emissions standards for those components of the exhaust gas. An indirect consequence of the oxidation capabilities of the DOC 30 is the ability of the DOC to oxidize NO into $NO_2$. In this manner, the level of $NO_2$ exiting the DOC 30 is equal to the $NO_2$ in the exhaust gas generated by the engine 20 in addition to the $NO_2$ converted from NO by the DOC.

In addition to treating the hydrocarbon and CO concentrations in the exhaust gas, the DOC 30 may also be used in the controlled regeneration of the DPF 40, SCR catalyst 50, and AMOx catalyst 60. This can be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, SCR catalyst 50, and/or the AMOx catalyst 60. The amount of unburned HC added to the exhaust gas is selected to achieve the desired temperature increase or target controlled regeneration temperature.

The DPF 40 may be any of various flow-through designs, and is structured to reduce particulate matter concentrations (e.g., soot and ash) in the exhaust gas to meet requisite emission standards. The DPF 40 captures particulate matter and other constituents, and thus can be periodically regenerated to burn off the captured constituents. Additionally, the DPF 40 may be structured to oxidize NO to form $NO_2$ independent of the DOC 30.

As discussed above, the SCR system 52 includes a reductant delivery system with a reductant (e.g., DEF) source 54, pump (not shown), and delivery mechanism or doser 56. The reductant source 54 can be a container or tank capable of retaining a reductant, such as, for example, ammonia ($NH_3$), DEF (e.g., urea), diesel oil, etc. The reductant source 54 is in reductant supplying communication with the pump, which is structured to pump reductant from the reductant source 54 to the delivery mechanism 56 via a reductant delivery line 58. The delivery mechanism 56 is positioned upstream of the SCR catalyst 50. The delivery mechanism 56 is selectively controllable to inject reductant directly into the exhaust gas stream prior to entering the SCR catalyst 50. As described herein, the controller 100 is structured to control the timing and amount of the reductant delivered to the exhaust gas. The reductant may decompose to produce ammonia. As briefly described above, the ammonia reacts with NOx in the presence of the SCR catalyst 50 to reduce the NOx to less harmful emissions, such as $N_2$ and $H_2O$. The NOx in the exhaust gas stream includes $NO_2$ and NO. Both $NO_2$ and NO are reduced to $N_2$ and $H_2O$ through various chemical reactions driven by the catalytic elements of the SCR catalyst in the presence of $NH_3$.

The SCR catalyst 50 may be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 50 is a zeolite-based catalyst. In other embodiments, the reductant includes a first reductant and a second reductant, wherein the first reductant is urea and the second reductant is ammonia.

Figure 2:
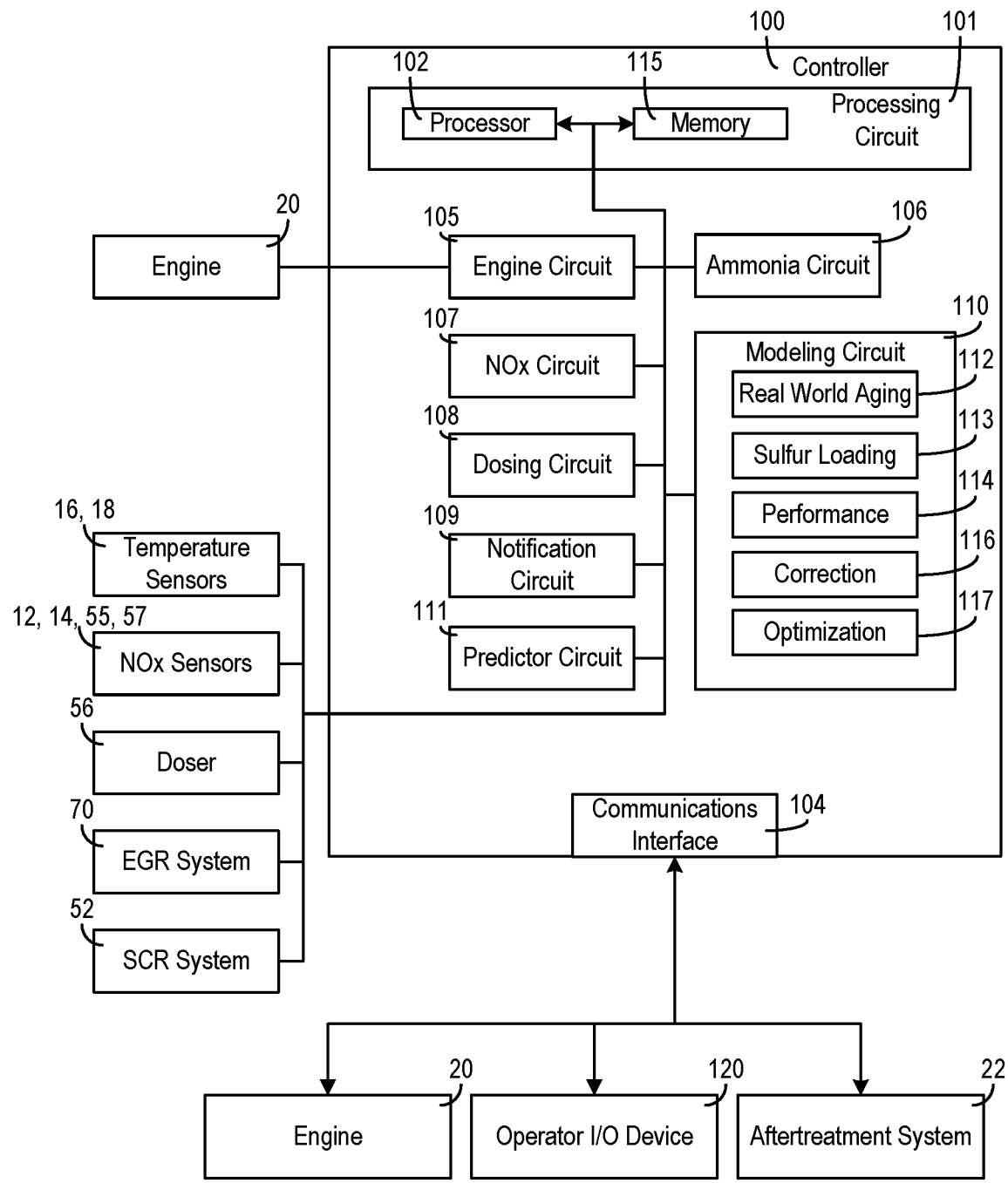
FIG. 2 is a schematic of the controller used with the system of FIG. 1, according to an example embodiment.

The AMOx catalyst 60 may be any of various flow-through catalysts structured to react with ammonia to produce mainly nitrogen. As briefly described above, the AMOx catalyst 60 is structured to remove ammonia that has slipped through or exited the SCR catalyst 50 without reacting with NOx in the exhaust. In certain instances, the aftertreatment system 22 can be operable with or without an AMOx catalyst. Further, although the AMOx catalyst 60 is shown as a separate unit from the SCR system 52 in FIG. 1, in some implementations, the AMOx catalyst may be integrated with the SCR catalyst (e.g., the AMOx catalyst and the SCR catalyst can be located within the same housing). In some embodiments, the SCR catalyst and AMOx catalyst are positioned serially with the SCR catalyst preceding the AMOx catalyst as shown in FIG. 2.

As referred to herein, the SCR catalyst 50 and AMOx catalyst 60 form the SCR and AMOx system. Accordingly, health or degradations determined are in regard to those catalysts.

Various sensors, such as NOx sensors 12, 14, 55, 57 and temperature sensors 16, 18, may be strategically disposed throughout the exhaust aftertreatment system 22 and may be in communication with the controller 100 and structured to monitor operating conditions of the engine system 10. It should be understood that one or more flow, pressure, and a variety of other sensors (oxygen sensors, exhaust gas constituent sensors, NH3 sensors) may also be included in the system and disposed in a variety of locations. As shown, more than one NOx sensor may be positioned upstream and downstream of the SCR catalyst 50. In this configuration, the NOx sensor 12 measures the engine out NOx while NOx sensor 55 measures the SCR catalyst 50 inlet NOx amount. This is due to DOC 30/DPF 40 potentially oxidizing some portion of the engine out NOx whereby the engine out NOx amount would not be equal to the SCR catalyst 50 inlet NOx amount. Accordingly, this configuration accounts for this potential discrepancy. The NOx amount leaving the SCR catalyst 50 may be measured by NOx sensor 57 and/or NOx sensor 14. In some embodiments, there may be only one such sensor, such as either one of either NOx sensor 57 or NOx sensor 14. The NOx sensor 57 (in some embodiments, NOx sensor 14) is positioned downstream of the SCR catalyst 50 and structured to detect the concentration of NOx in the exhaust gas downstream of the SCR catalyst (e.g., exiting the SCR catalyst).

The temperature sensors 16 are associated with the DOC 30 and DPF 40, and thus can be defined as DOC/DPF temperature sensors 16. The DOC/DPF temperature sensors are strategically positioned to detect the temperature of exhaust gas flowing into the DOC 30, out of the DOC and into the DPF 40, and out of the DPF before being dosed with DEF by the doser 56. The temperature sensors 18 are associated with the SCR catalyst 50 and thus can be defined as SCR temperature sensors 18. The SCR temperature sensors 18 are strategically positioned to detect the temperature of the exhaust gas flowing into and out of the SCR catalyst 50.

The EGR system 70 is structured to recirculate exhaust gas back to an intake manifold of the engine 20 to be re-used for combustion. By routing exhaust gas back to the engine 20 for combustion, inert gases are provided for combustion and function to absorb combustion heat to reduce peak in-cylinder temperatures. Advantageously, this function works to reduce nitrogen nitrogen (NOx) emissions from the engine 20. As shown, the EGR system 70 includes an EGR orifice 72, an EGR cooler 74, and an EGR valve 76. It should be understood that this diagram is an example only and not meant to be limiting as many other components may be added or excluded from the EGR system 70 (as well as the engine system, for instance). For example, the EGR orifice 72 is an optional component as is the EGR cooler 74, as some configurations may not include these components. The EGR valve 76 is selectively activated by the controller 100 and includes any type of valve typically included with EGR systems. When the EGR valve 76 is fully closed, exhaust gas is inhibited from recirculating back to the intake manifold. When the EGR valve 76 is fully or partially open, exhaust gas is permitted to recirculate back to the intake manifold. The EGR orifice 72 is structured as any type of EGR orifice typically included in EGR systems. The EGR orifice 72 is situated between an exhaust manifold of the engine 20 and the EGR valve 76. Due to this positioning, a pressure drop is formed across the EGR orifice 72 whenever exhaust gas is recirculated to the intake manifold (e.g., the EGR valve 76 is open or partially open). Temperature sensors, pressure sensors, and/or flow sensors may be positioned proximate the EGR orifice 72 and may be communicably coupled to the controller 100 and structured to acquire and provide data indicative of a temperature, pressure, and flow of exhaust gas flowing through the EGR orifice 72 in the EGR system 70 toward the intake manifold.

As mentioned above, the EGR system 70 includes an EGR cooler 74 and an EGR valve 76. The EGR cooler 74 is structured as any type of heat exchanger typically included in EGR systems including, but not limited to, air-to-air and/or liquid (e.g., coolant)-to-air (e.g., exhaust gas) heat exchangers. The EGR cooler 74 is structured to remove heat from the exhaust gas prior to the exhaust gas being reintroduced into the intake manifold. Heat is removed from the exhaust gas prior to reintroduction to, among other reasons, prevent high intake temperatures that could promote pre-ignition (e.g., engine knock). Additional temperature sensors, pressure sensors, and/or flow sensors may be positioned after the EGR valve 76 proximate a charge air stream. Accordingly, data indicative of the temperature, pressure, and flow of the exhaust gas entering the charge air stream (and, consequently, the intake manifold) can be communicated to the controller 100. Moreover, data indicative of the temperature drop as measured by temperature sensors upstream and downstream of the EGR cooler 74 may be determined and/or approximated.

Although the exhaust aftertreatment system 22 shown includes one of a DOC 30, DPF 40, SCR catalyst 50, and AMOx catalyst 60 positioned in specific locations relative to each other along the exhaust flow path, in other embodiments the exhaust aftertreatment system may include more than one of any of the various catalysts positioned in any of various positions relative to each other along the exhaust flow path. Additionally, although the DOC 30 and AMOx catalyst 60 are non-selective catalysts, in some embodiments, the DOC and AMOx catalyst can be selective catalysts. Further, the EGR system 70 may include other flow paths, or components not described above.

FIG. 1 is also shown to include an operator input/output (I/O) device 120. The operator I/O device 120 is communicably coupled to the controller 100, such that information may be exchanged between the controller 100 and the I/O device 120. The information exchanged between the controller 100 and the I/O device 120 may relate to one or more components of FIG. 1 or any of the determinations of the controller 100 disclosed herein. The operator I/O device 120 enables an operator of the vehicle (or an occupant of the vehicle) to communicate with the controller 100 and other components of the vehicle, such as those illustrated in FIG. 1. For example, the operator input/output device 120 may include an interactive display, a touchscreen device, one or more buttons and switches, voice command receivers, etc. The controller 100 may provide a fault notification (e.g., via the I/O device 120) based on the determined state of the SCR and AMOx system (e.g., a fault code, malfunction indicator light, etc.).

The controller 100 is structured to control, at least partly, the operation of the system 10 and associated sub-systems, such as the internal combustion engine 20 and the exhaust aftertreatment system 22. According to one embodiment, the components of FIG. 1 are embodied in a vehicle. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 100 is communicably coupled to the systems and components of FIG. 1, the controller 100 is structured to receive data from one or more of the components shown in FIG. 1. For example, the data may include NOx data (e.g., an incoming NOx amount from NOx sensor 55 and an outgoing NOx amount from NOx sensor 57), dosing data (e.g., timing and amount of dosing delivered from doser 56), and vehicle operating data (e.g., engine speed, vehicle speed, engine temperature, etc.) received via one or more sensors. As another example, the data may include an input from operator input/output device 120. As described more fully herein, using this data, the controller 100 diagnoses the SCR, AMOx, and EGR systems during operation, such as by controlling one or more components of the system 10 including at least the doser 56 for reductant dosing, injector for hydrocarbon injection, engine operation (e.g., to increase temperature of the exhaust gas via combustion, piston speed, among others), etc. The structure and function of the controller 100 are further described in regard to FIG. 2.

As shown in FIG. 2, an example structure for the controller 100 includes a processing circuit 101 including a processor 102, a memory 115, and various circuits including at least an engine circuit 105, ammonia circuit 106, NOx circuit 107, dosing circuit 108, notification circuit 109, modeling circuit 110, and predictor circuit 111. The processor 102 may be implemented as a processor, an application specific integrated circuit (ASIC), one or more field programmable gate arrays (FPGAs), a digital signal processor (DSP), a group of processing components, or other suitable electronic processing components. The memory 115 (e.g., RAM, ROM, Flash Memory, hard disk storage, etc.) may store data and/or computer code for facilitating the various processes described herein. The memory 115 may be communicably connected to the processor 102 and one or more circuits (e.g., engine circuit 105, ammonia circuit 106, NOx circuit 107, dosing circuit 108, notification circuit 109, modeling circuit 110, or predictor circuit 111) and structured to provide computer code or instructions to the processor 102 for executing the processes described in regard to the controller 100 herein. Moreover, the memory 115 may be or include tangible, non-transient volatile memory or non-volatile memory. Accordingly, the memory 115 may include database components, object code components, script components, or any other type of information structure for supporting the various activities and information structures described herein.

The controller 100 is structured to receive inputs (e.g., signals, information, data, etc.) from the system 10 components/systems and/or operator I/O device 120. Thus, the controller 100 is structured to control, at least partly, the system 10 components/systems and associated vehicle. As the components of FIG. 2 can be embodied in a vehicle, the controller 100 may be structured as one or more electronic control units (ECU). The controller 100 may be separate from or included with at least one of a transmission control unit, an exhaust aftertreatment control unit, a powertrain control module, an engine control module, etc.

In one configuration, one or more circuits (e.g., engine circuit 105, ammonia circuit 106, NOx circuit 107, dosing circuit 108, notification circuit 109, modeling circuit 110, or predictor circuit 111) can be embodied as machine or computer-readable media that stores instructions that are executable by a processor, such as processor 102, and stored in a memory device, such as memory 115. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, one or more circuits are embodied as hardware units, such as electronic control units. As such, the one or more may be embodied as one or more circuitry components including, but not limited to, processing circuitry, network interfaces, peripheral devices, input devices, output devices, sensors, etc. In some embodiments, the one or more circuits may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the one or more circuits may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The one or more circuits may also include programmable hardware devices such as field programmable gate arrays, programmable array logic, programmable logic devices or the like. The one or more circuits may include one or more memory devices for storing instructions that are executable by the processor(s) of the individual circuits (e.g., engine circuit 105, ammonia circuit 106, NOx circuit 107, dosing circuit 108, notification circuit 109, modeling circuit 110, or predictor circuit 111). The one or more memory devices and processor(s) may have the same definition as provided below with respect to the memory 115 and processor 102. In some hardware unit configurations, the one or more circuits may be geographically dispersed throughout separate locations in, for example, a vehicle. Alternatively and as shown, the one or more circuits may be embodied in or within a single unit/housing, which is shown as the controller 100.

In the example shown, the controller 100 includes the processing circuit 101 having the engine circuit 105, ammonia circuit 106, NOx circuit 107, dosing circuit 108, notification circuit 109, modeling circuit 110, or predictor circuit 111. The processing circuit 101 may be structured or configured to execute or implement the instructions, commands, and/or control processes described herein with respect to the engine circuit 105, ammonia circuit 106, NOx circuit 107, dosing circuit 108, notification circuit 109, modeling circuit 110, or predictor circuit 111. The depicted configuration represents the engine circuit 105, ammonia circuit 106, NOx circuit 107, dosing circuit 108, notification circuit 109, modeling circuit 110, or predictor circuit 111 as instructions in machine or computer-readable media. In some embodiments, the instructions may be stored by the memory device. However, as mentioned above, this illustration is not meant to be limiting as the present disclosure contemplates other embodiments where the engine circuit 105, ammonia circuit 106, NOx circuit 107, dosing circuit 108, notification circuit 109, modeling circuit 110, and predictor circuit 111, or at least one of the one or more circuits, is configured as a hardware unit. All such combinations and variations are intended to fall within the scope of the present disclosure.

In the example shown, the controller 100 includes at least an engine circuit 105 structured to control the engine 20, a NOx circuit 107 in communication with the NOx sensors 12, 14, 55, 57, an ammonia circuit 106 in communication with sensors associated with the SCR catalyst 50 and/or the AMOx catalyst 60, a dosing circuit 108 structured to control operation of the DEF source 54, a notification circuit 109, a modeling circuit 110 structured to manage one or more models (e.g., aging model, sulfur loading model, correction model, etc.) of the controller 100, and a predictor circuit 111 structured to predict the performance, values, or output of one or more components of the aftertreatment system 22, such as the engine 20, EGR system 70, or SCR system 52.

The engine circuit 105 is structured to receive information from a user (e.g., via the operator input/output device 120) and to provide instructions to or otherwise control the engine 20. For instance, the engine circuit 105 can control the operations or components of the engine including at least the intake valve for controlling intake air or gas, the piston for initiating compression and combustion to generate motion for the vehicle, the exhaust valve to release the exhaust gas through the pipe (e.g., piping 24, 28A-C, 26, etc.), or other components of the engine 20. In some cases, the engine circuit 105 can reduce combustion by lowering intake air or gas, such as to decrease NOx output from the engine 20. In some other cases, the engine circuit 105 can increase RPM of the engine to increase the temperature of the exhaust gas for passive/active regeneration of one or more catalyst. In certain cases, the engine circuit 105 can increase or decrease the engine load for temperature control. In some cases, the engine circuit 105 may decrease the fueling rate to increase the NOx output, thereby optimizing or decreasing fuel consumption.

The NOx circuit 107 is structured to communicate with the NOx sensors 12, 14, 55, 57 and provide information regarding NOx levels to other circuits of the controller 100 and to components of the memory 115. The NOx circuit 107 may process raw data received from the NOx sensors 12, 14, 55, 57 in addition to other sensor data to provide information indicative of a NOx level to other circuits of the controller 100 and to components of the memory 115.

The ammonia circuit 106 is structured to determine an ammonia storage value indicative of an amount of ammonia stored in the SCR catalyst 50. The ammonia circuit 106 is structured to communicate with the dosing circuit 108, the temperature sensors 16, 18, and the NOx sensors 12, 14, 55, 57 to determine the ammonia storage value. The ammonia circuit 106 is further structured to determine a nitrogen oxide conversion efficiency of the SCR system 52 based at least in part on the NOx levels and the ammonia storage indication/value. In some cases, the controller 100 can determine the ammonia storage based on at least historical ammonia dosing, engine-out NOx, and tailpipe NOx, indicating the amount of ammonia provided and used during NOx conversion, for example. In some cases, the controller 100 can receive the ammonia storage indication from one or more sensors coupled to one or more components of the system 10.

The dosing circuit 108 is structured to provide a dosing command that adjusts a reductant dosing amount and timing of a dosing injection. As such, the dosing command may be provided to a doser, such as doser 56. The dosing circuit 108 may also communicate with the ammonia circuit 106 and the NOx circuit 107, and accumulate dosing data regarding the amount and timing of reductant added to the aftertreatment system 22. In some cases, the dosing circuit 108 can communicate with the modeling circuit 110 or predictor circuit 111 to adjust the reductant dosing amount and the timing of the dosing injection. For example, the dosing circuit 108 can receive data indicating the NOx conversion efficiency and/or NH3 slip from the predictor circuit 111 based on the aftertreatment system 22 exposure to chemical and thermal exposure over time. Based on the modeled performance of the aftertreatment system 22 (or one or more components of the aftertreatment system 22), the dosing circuit 108 may configure the reductant dosing amount or the frequency of the dosing injection.

In some implementations, the dosing circuit 108 can communicate with the modeling circuit 110 or the predictor circuit 111 to determine the deactivation of the SCR catalyst 50. For instance, the deactivation of the SCR catalyst 50 can affect the NH3 storage capacity (e.g., reduces the storage capacity). The dosing circuit 108 can receive or obtain data from the modeling circuit 110 or the predictor circuit 111 to increase or decrease reductant dosing based on the deactivation level of the catalyst 50. For example, the dosing circuit 108 can receive an indication of at least one deactivation threshold, where in response to the catalyst 50 satisfying or exceeding the threshold, the dosing circuit 108 can adjust the dosage level accordingly. In some cases, the dosing circuit 108 may adjust the reductant dosing amount based on the nitrogen oxide conversion efficiency indicated by the model of the catalyst 50 managed by the modeling circuit 110.

In some implementations, the controller 100 can include a circuit to control hydrocarbon dosing/injection (e.g., injection of hydrocarbon). The hydrocarbon compound may be stored in a tank or storage, such as a hydrocarbon source. The controller 100 can increase, decrease, or maintain the level of hydrocarbon dosing into the gas exhaust stream (e.g., exhaust piping 28A, 28B, or 28C) (e.g., via near or far post-injection). The hydrocarbon source can be positioned similar to or different from the DEF source 54 in the aftertreatment system 22. The controller 100 can trigger a hydrocarbon dosing event to increase the temperature at least the DPF 40 or the catalyst 50, for example. By increasing the temperature, such as above or around 425 Celsius for desorption of weakly bound sulfur, the controller 100 can recover NOx conversion performance. The controller 100 can trigger hydrocarbon events to regenerate the DPF 40 in response to the deactivation level exceeding a threshold (e.g., 70%, 75%, or 80% NOx conversion efficiency). The controller 100 can regenerate the reversible performance of the DPF 40 or the catalyst 50.

The notification circuit 109 is structured to provide one or more notifications. The notifications may correspond with a fault code, a notification (e.g., on the operator I/O device 120), a diagnostic trouble code, and the like. The notification may indicate the state (e.g., healthy or degraded) for the SCR and AMOx system and the EGR system 70. For example, the notification circuit 109 can report or provide a fault code in response to detecting a fault with the doser 56, one or more sensors (e.g., NOx sensor 12, 14, 55, or 57, or temperature sensor 16 or 18), oxidation catalyst (e.g., DOC 30), among other components of the aftertreatment system 22. In another example, the notification circuit 109 can provide a notification of the state, a condition, etc. of at least the SCR system 52 including the SCR catalyst 50 (sometimes referred to as a catalyst, SCR, or NOx reduction catalyst).

The modeling circuit 110 is structured or configured to generate, retrieve, maintain, modify, configure, or update one or more models. The model can be used by the controller 100, one or more circuits (e.g., the predictor circuit 111, NOx circuit 107, dosing circuit 108, etc.) of the controller 100, or other components discussed herein. The modeling circuit 110 can generate a model locally, such as in the vehicle. The modeling circuit 110 can retrieve or obtain a model from storage or memory, such as a local data storage, a remote data repository, or a cloud service. In this case, the model may be generated by a remote computing device or a remote service, which can store the generated model in the storage.

The modeling circuit 110 can communicate with the predictor circuit 111 to make a prediction. The modeling circuit 110 can be updated by one or more circuits or components of the controller 100. In some cases, the modeling circuit 110 can execute or perform one or more operations of the model. The model can include at least one or a combination of an aging model, sulfur loading model, or a correction model. The modeling circuit 110 can provide a model indicating a representation of the aftertreatment system 22 or the SCR system 52. The modeling circuit 110 can manage one or more models, such as models discussed in conjunction with at least FIGS. 3-15.

The modeling circuit 110 can include one or more modules, such as real-world aging module 112, sulfur loading module 113, performance module 114, correction module 116, and optimization module 117, among others. The one or more modules can include executable code, scripts, or instructions to perform the respective features or functionalities, such as discussed in at least FIGS. 6-15. The one or more modules may be composed of hardware, software, or a combination of hardware and software components. In some cases, the one or more modules can be a part of the modeling circuit 110 or separate components from the modeling circuit 110. In some cases, the one or more modules can include or correspond to one or more portions of a model, such that the combination of modules can form into a single model, for example. In some cases, the one or more modules can be separate models generated, adjusted, or configured by the modeling circuit 110.

The real-world aging module 112 is structured to track the change in the catalyst state as a function of real-world aging (e.g., degradation, wear, aging, deactivation, or changes in the performance of the catalyst). The terms "degradation" and "deactivation" of the catalyst can be interchangeable. The controller 100 can use the real-world aging module 112 to monitor at least the historical regenerations of the catalyst (e.g., throughout the lifetime of the catalyst or within a predetermined time frame, such as a week, month, year, etc.), engine fuel consumption, or other factors contributing the usage of the catalyst.

The sulfur loading module 113 is structured to track permanent or temporary changes in the sulfur loading of the catalyst during real-world aging. Permanent sulfur loading refers to sulfur loading on the catalyst, which may not be removed via regeneration (e.g., active or passive regenerations), thereby causing irreversible deactivation of the catalyst. Temporary sulfur loading refers to removable sulfur content (or other particulate matter), which temporarily degrades the performance of the catalyst until regeneration. The controller 100 can regenerate the catalyst to burn off the particulate matter and certain sulfur loaded on the catalyst.

The performance module 114 is structured to determine, identify, or predict the performance of the catalyst (e.g., output from the catalyst) based on at least the reductant injection rate, engine-out NOx, and/or tailpipe NOx sensor measurement. For example, the performance module 114 can assess the performance of the catalyst by predicting the tailpipe NOx sensor and comparing the prediction to the measured tailpipe NOx. The performance module 114 can perform the prediction based on historical engine-out NOx, reductant injection rate, and measured NOx at the tailpipe, thereby comparing the current engine-out NOx and reductant injection rate to an expected tailpipe NOx value. Based on the comparison between the prediction and the determined measurement, the performance module 114 can provide data to an aging correction module to correct for catalyst age. The performance module 114 may or may not be adjusted for aging. For instance, the performance module 114 may compare the predicted performance (e.g., by the predictor circuit 111) and the determined performance (e.g., by measuring input and output NOx values) of the catalyst to correct the reductant doser for aging. In another example, the performance module 114 may perform the comparison for the predicted and determined performance of the catalyst in response to adjustment for aging to perform a subsequent aging correction.

The correction module 116 can include at least one of aging correction module or sensor-based correction module. The aging correction module can correct or adjust a model for the aging of the catalyst to improve the prediction capabilities, such as predicting degradation of the catalyst functions and performance as a function of real-world aging. For example, the aging correction module can correct for catalyst aging based on historical predictions and measurements of the NOx output at the tailpipe based on varying engine-out NOx and reductant injection rates. In some cases, the sensor-based correction module can correct or recalibrate one or more sensors (e.g., a correlation between a measurement (e.g., voltage, etc.)-to-sensor output value, such as a NOx output amount at a particular moment in time) based on a comparison between the prediction and the measurement. For instance, upon calibrating the model (e.g., aging correction module) and/or regenerating the catalyst, the sensor-based correction module can determine whether the difference between the model and the measured value satisfies a threshold (e.g., configured by the operator, such as 10%, 20%, etc. difference from each other). If the difference does not satisfy the threshold (e.g., minimal differences), the sensor-based correction module may not recalibrate the sensor. Otherwise, the sensor-based correction module can determine to recalibrate or correct the sensor, such as due to inaccuracy of the sensor based on the prediction.

The optimization module 117 can include or correspond to at least one of a fluid consumption optimization module, fuel sulfur modification module, engine-out NOx optimization module, tailpipe N2O and NOx optimization module, or engine thermal management module. As an overview, the fluid consumption optimization module can optimize the engine fuel consumption as a function of aging, such as by increasing fuel consumption during high NOx conversion or decreasing fuel consumption as the catalyst deactivates (e.g., degrade) over time. The fuel sulfur modification module can adjust the model to account for high sulfur content in the fuel during engine operation, such as adjusting the rate or amount of injection to regenerate the catalyst due to the sulfur loading on the catalyst. The engine-out NOx optimization module can adjust the NOx concentration volume or amount from the engine 20 in response to tailpipe NOx exceeding a threshold (e.g., NOx value threshold at tailpipe), such as configuring one or more components of the system 10 or engine 20, such as adjusting the temperature, regenerate the catalyst, reduce fuel consumption, etc., thereby affecting the number of regenerations, fuel consumption, airflow rate, temperature, engine-out O2, engine-out NOx, etc. The tailpipe N2O and NOx optimization module can optimize the tailpipe N2O or NOx slip by adjusting the reductant injection rate in response to at least N2O exceeding the threshold at the tailpipe. The engine thermal management module can manage or configure the engine thermal, for example, reduce certain types of gas concentration by reducing the temperature of the exhaust gas or regenerating the catalyst (e.g., active or passive regeneration) via increasing the exhaust gas temperature to burn off particulate matter. The optimization module 117 (among other modules) can be described in conjunction with at least FIGS. 8, 9, 12, 13, and 14.

The predictor circuit 111 can be structured to predict or determine the state, condition, etc. of the SCR catalyst 50 or the SCR system 52, among other components of the aftertreatment system 22. The predictor circuit 111 can communicate with the modeling circuit 110 (or other circuits) and one or more components of the aftertreatment system 22, such as at least the doser 56 or the SCR system 52. In some cases, the predictor circuit 111 can communicate with the dosing circuit 108 to control the doser 56. In some cases, the predictor circuit 111 can provide inputs to the modeling circuit 110. The predictor circuit 111 can utilize the model to predict one or more values, such as the NOx conversion efficiencies, remaining NOx downstream of the SCR catalyst 50 (e.g., NOx value at NOx sensor 57 or 14), or slippage of NH3 downstream of the SCR catalyst 50. In some cases, the predictor circuit 111 can predict value upstream of the SCR catalyst 50, such as engine-out NOx, upstream temperature, exhaust flow rate, or other data to be captured by one or more sensors of the aftertreatment system 22. The predictor circuit 111 can perform the prediction in conjunction with operations or techniques of at least FIGS. 3-15, for example.

The circuits of the controller 100 and the components of the memory 115 communicate with the engine system 10 to provide a prediction of NOx conversion, NH3 slip, or performance of one or more components (e.g., SCR system or EGR system) of the aftertreatment system 22. Using the prediction, the circuits of the controller 100 and the components of the memory 115 communicate with the engine system 10 to improve dosing control, NOx conversion, and mitigate NH3 slippage, among other enhancements. More specifically, due to the aging (e.g., thermal and chemical exposure over time) of the SCR catalyst 50, the performance of the SCR catalyst 50 may be reduced. The one or more circuits of the controller 100 can use the values indicative of the performance of the SCR catalyst 50 (e.g., NOx conversion, NH3 surface coverage, NH3 slip, etc.) to determine the aging effect (or the aging) of the SCR catalyst 50. The one or more circuits can update the model representing the SCR catalyst 50 to account for aging, such as to minimize NH3 or NOx slip, maximize NOx conversion, and optimize active regeneration of the particulate filter to mitigate irreversible deactivation of the catalyst 50. The one or more components of the system 10, such as the SCR system 52, EGR system 70, engine 20, aftertreatment system 22, controller 100, or operator I/O device 120, can be discussed in conjunction with at least FIGS. 3-15. For instance, the system 300 can operate or execute features or functionalities of the circuits of the controller 100. In another example, one or more methods (e.g., methods of flow diagrams 600, 700, etc.) discussed in conjunction with at least FIGS. 6-15 can be performed, operated, or executed by the controller 100, among other components of the system 10. The method discussed with respect to at least FIGS. 6-15 may provide references to the controller 100, processor 102, and one or more circuits (e.g., engine circuit 105, ammonia circuit 106, NOx circuit 107, dosing circuit 108, notification circuit 109, modeling circuit 110, or predictor circuit 111), though it should be understood that other controllers with alternative structures may be used to implement the processes and methods disclosed herein.

Figure 3:
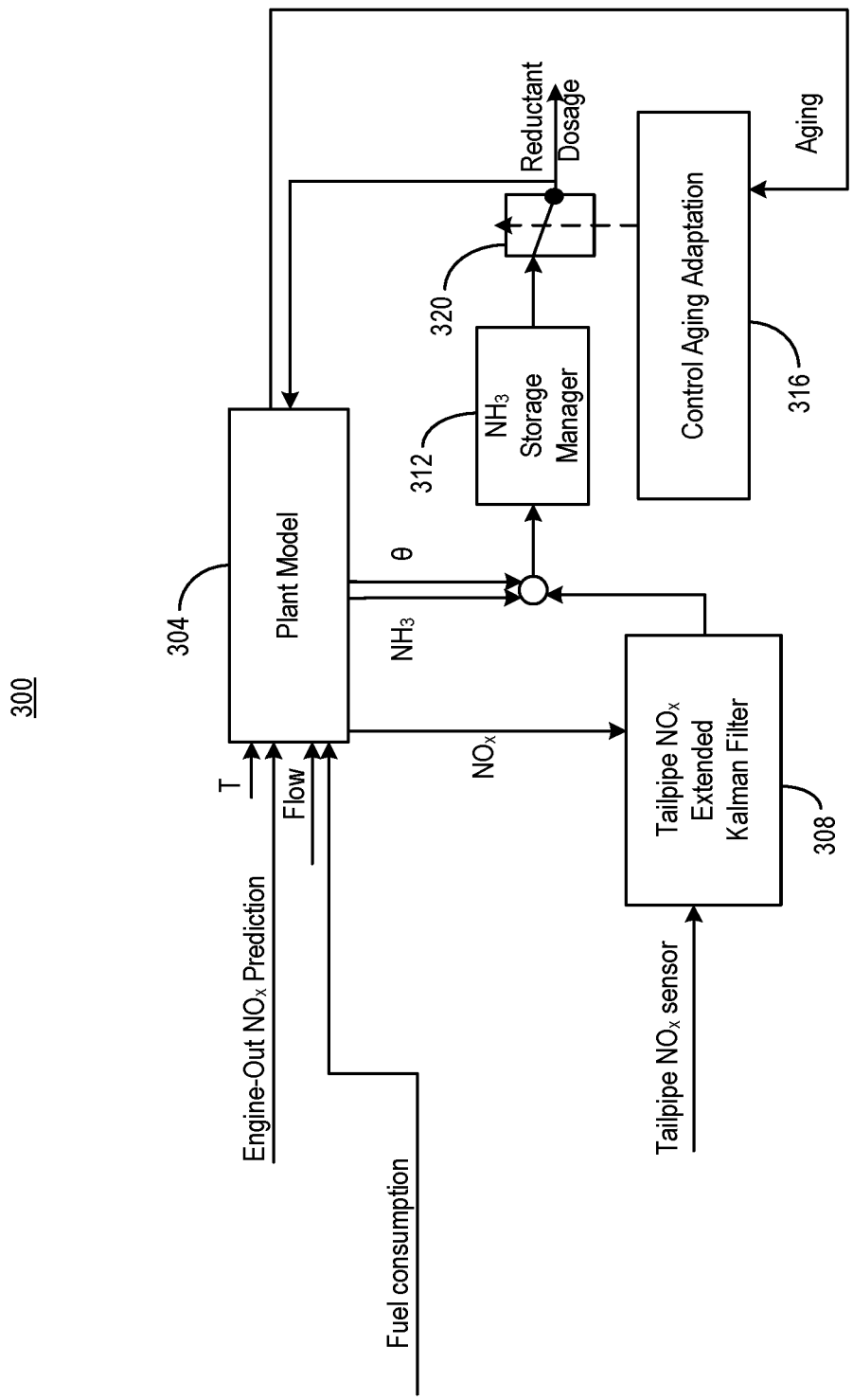
FIG. 3 is a schematic diagram of a system for modeling the catalyst and controlling reductant dosage, according to an example embodiment.

Referring to FIG. 3, a schematic diagram of a system 300 for modeling the catalyst and controlling reductant dosage is shown, according to an example embodiment. The system 300 can include at least one model 304 (sometimes referred to as a plant model), at least one Kalman filter 308 (sometimes referred to as tailpipe NOx extended Kalman filter), at least one NH3 storage manager 312, at least one control aging adaptation 316, and at least one reductant storage 320. The components (e.g., model 304, Kalman filter 308, NH3 storage manager 312, control aging adaptation 316, or reductant storage 320) of the system 300 can include or be composed of hardware, software, or a combination of hardware and software components. In one embodiment, the components are included with the controller 100. In another embodiment, one or more components are included with a remote computing system coupled to the controller 100. The one or more components of the system 300 can be in electrical communication with each other, such that the model 304 can communicate data with the Kalman filter 308, the storage manager 312, or the control aging adaptation 316.

The model 304 can be managed by the modeling circuit 110. For example, the modeling circuit 110 can maintain, retrieve, generate, or update the model 304. The modeling circuit 110 may retrieve a model 304 from a storage, such as a local or remote storage. The modeling circuit 110 may generate the model 304. In some cases, the model 304 may be generated by a remote computing device or system. The modeling circuit 110 can provide input data or feedback data to the model 304. The modeling circuit 110 can train the model 304 using the input data. Training the model 304 may refer to updating or adapting the model 304 based on the aging or degradation of the catalyst 50 (or other catalysts of the aftertreatment system 22). The input data to the model 304 can include at least data of the engine 20, the temperature sensed by one or more temperature sensors (e.g., temperature sensor 16 or 18), fuel consumption, and engine-out NOx (e.g., sensed by NOx sensor 12, 55, 57, or 14). The modeling circuit 110 can provide the data to the model 304 in response to receiving the data from at least one sensor of the aftertreatment system 22 or other components of the system 10, for example. In another example, the modeling circuit 110 can receive the data from one or more circuits of the controller 100.

The model 304 can be a physics-based plant model 304 of a NOx reduction catalyst, which can be used by one or more modules of the modeling circuit 110. For example, the one or more modules can use the model 304 to estimate and monitor exhaust aftertreatment system performance using measurements from virtual and/or physical sensors of the system 10 as inputs. The controller 100 can use the model 304 to determine the inlet and outlet gas concentrations to determine at least the conversion efficiency of the catalyst, for example. In some cases, the model 304 can be generated or configured for other components of the system 10.

The model 304 can represent one or more portions of the system 10. For example, the model 304 can include an engine 20 portion, DOC 30 portion, DPF 40 portion, SCR 50 portion, or AMOx catalyst 60. The model 304 can include other portions to represent the system 10 or at least the aftertreatment system 22.

The modeling circuit 110 can train the model 304 using data from the aftertreatment system 22 (e.g., one or more components or sensors of the system 10). The modeling circuit 110 can update the model 304 based on a time interval, such as hourly, daily, weekly, biweekly, etc. In some cases, the modeling circuit 110 can update the model 304 subsequent to receiving new data from at least one component of the system 10. In some implementations, the modeling circuit 110 may be configured to process input data or perform operations corresponding to, in addition to, or as part of the model 304.

The model 304 can include, correspond to, or be a part of at least the aging model, sulfur loading model, or aging correction model. For instance, the model 304 can perform (or be used to perform) features, functionalities, or operations to track the changes in the state of the catalyst 50. The model 304 can be used to monitor other catalysts in addition to or instead of catalyst 50, for example. The state of the catalyst 50 may correspond to or be associated with the number of active sites, portions, or sections of the catalyst 50. For example, the catalyst 50 can include a number of sites. A site may be active for converting NOx using NH3. The site may become inactive or at least partially inactive (i.e., conversion below a desired threshold) due to chemical or thermal exposure, such as sulfur loading. The model 304 can track the permanent (irreversible) or temporary (reversible) sulfur loading or deactivation of the catalyst 50. The model 304 can be used to predict the degradation of the catalyst function or performance. In some cases, the model 304 may be represented similar to or in conjunction with the model 400 of FIG. 4A.

The model 304 can be used by the controller 100 (or one or more circuits of the controller 100). For example, the predictor circuit 111 can use the model 304 to predict at least the amount of ammonia surface coverage at the catalyst 50. The predictor circuit 111 can determine an amount of urea dosing to provide to the SCR catalyst 50 based on at least the ammonia surface coverage, exhaust flow rate, the temperature of the SCR catalyst 50, or the state of the SCR catalyst 50. The predictor circuit 111 can use the model 304 to predict at least the NOx or NH3 at one or more portions of the aftertreatment system 22 (e.g., upstream or downstream the SCR catalyst 50).

In some cases, the predictor circuit 111 can use the model 304 to determine the aging effect on the SCR catalyst 50, DPF 40, or other components of the aftertreatment system 22. For example, by feeding the input data to the model 304, the modeling circuit 110 can enable the model 304 to track the changes of at least the output of the aftertreatment system 22 and the reductant dosing control which may be affected by the degradation or aging of the catalyst 50. The reductant dosing control may be changed automatically by the dosing circuit 108 based on the NOx value sensed downstream of the catalyst 50. The predictor circuit 111 can communicate data (e.g., predicted or estimated data) to at least the dosing circuit 108 for controlling the reductant injection. In some cases, the dosing circuit 108 may use the model 304 to determine the frequency and amount of reductant injection. By using the model 304 to determine the upstream or downstream NOx value (or NH3 value), the controller 100 can optimize NOx conversion and minimize NH3 slip downstream of the SCR catalyst 50. Further examples of the features, operations, or usage of the model 304, the Kalman filter 308, the NH3 storage manager 312, or the control aging adaptation 316 can be discussed herein.

The predictor circuit 111 can predict the NH3 surface coverage, the tailpipe NOx slip, and the NH3 slip. To make the prediction, the modeling circuit 110 may set one or more boundary conditions for the model 304. The boundary conditions can include input data provided to the model 304 to generate an output or prediction of the aftertreatment system state. For example, the modeling circuit 110 can set at least engine-out NOx prediction (e.g., virtual or physical sensor), exhaust flow rate, and aftertreatment inlet temperature as the boundary conditions. The modeling circuit 110 can set other data as part of the boundary condition. The predictor circuit 111 can predict the engine-out NOx prediction based on data from the engine 20, temperature from at least one temperature sensor, or NOx measurement by at least one of the NOx sensors (e.g., sensed NOx value upstream or downstream from the catalyst 50). The predictor circuit 111 can provide data associated with the boundary conditions to the model 304.

In response to providing the data, the model 304 can consider or account for DOC kinetics (e.g., operations or output of the DOC 30) to determine the ratio between the SCR-inlet NO2 and NOx. For instance, the DOC kinetics may represent or provide an indication of NO2 and NOx at the inlet of the SCR catalyst 50. At the SCR catalyst 50 portion of the model 304, the model 304 can utilize the input from at least one of the engine 20, the DOC 30, the DPF 40, or the DEF 54 to determine the state of the SCR 50. For example, the predictor circuit 111 can use the model 304 to process the input data (e.g., the boundary conditions) and the reductant dosing rate to determine the SCR state. The SCR state or catalyst state can include at least SCR catalyst bed temperature, NH3 coverage, and formation of ammonia nitrate (AN). In some cases, by processing at least the input data and the reductant dosing rate, the predictor circuit 111 can use the model to determine or predict the output from the SCR 50. The output of the SCR 50 determined by the predictor circuit 111 using the model 304 can include at least gas concentration downstream from the SCR catalyst 50. The predictor circuit 111 can determine the gas concentration of NO, NO2, NH3, or N2O, among other gas types at the output of the catalyst 50. The predictor circuit 111 can use the model to determine other observables in the aftertreatment system 22. The predictor circuit 111 can use model 304 can consider AMOX effects through a reduced-order model of the dual-layer catalyst. The reduced-order model can be described in conjunction with FIG. 4A. The dual-layer catalyst may include, be a part of, or refer to the AMOx catalyst 60 or other catalysts of the aftertreatment system 22.

The predictor circuit 111 can obtain or receive output data from the model 304, based on the input (e.g., historical data sensed by the sensors of the system 10 and dosing injection rate). The output can include at least the NH3 slip or NH3 surface coverage of the SCR catalyst 50. The predictor circuit 111 can provide the output data from the model 304 to the dosing circuit 108 for controlling the doser 56. The predictor circuit 111 can predict the outlet NOx from the SCR catalyst 50 using model 304. The predictor circuit 111 can correct the NOx outlet prediction with tailpipe NOx sensor measured after correcting for cross-sensitivity. For example, the Kalman filter 308 may be a part of one or more circuits of the controller 100. The Kalman filter 308 can receive the NOx prediction from the model 304 (or the predictor circuit 111). The Kalman filter 308 can receive data from at least one tailpipe NOx sensor (e.g., NOx sensor 57 or 14). The data can include a value or an amount of chemical (in this case NOx) exiting the pipe 28C or 26. In some cases, the Kalman filter 308 can receive data from an NH3 sensor (not shown) to measure the amount of NH3 sensed downstream of the SCR catalyst 50.

The Kalman filter 308 can compare the predicted NOx amount from the model 304 to the sensed NOx amount from at least one NOx sensor. The predicted NOx amount and the sensed NOx amount can correspond to the same region or section of the model 304 representing the aftertreatment system 22, such as at NOx sensor 57 or NOx sensor 14. The Kalman filter 308 can correct the predicted NOx amount from the model 304 based on the comparison to the NOx sensor. For example, the Kalman filter 308 can feed the sensed NOx value to the model 304 for correction or updating the model 304. In another example, the Kalman filter 308 can provide feedback data to the model 304. The Kalman filter 308 may be nonlinear, such that the nonlinear state formula and covariance propagation model can be linearized with respect to the new state and covariance estimate.

The controller 100 can use data from at least the model 304 and the Kalman filter 308 to maximize surface coverage of ammonia and NOx conversion efficiency within a threshold. In some cases, the theta or θ may represent the dosing circuit 108 of the controller 100 configured to control reductant dosage from the NH3 storage manager 312. The NH3 storage manager 312 may correspond to or be a part of the dosing circuit 108. For example, the controller 100 can be configured with or assigned a threshold NH3 slip. The threshold may be predetermined by the administrator of the system 300 or system 10, for example. The controller 100 (e.g., predictor circuit 111) can determine whether the NH3 downstream of the SCR catalyst 50 exceeds the threshold. If the NH3 amount does not exceed the threshold, the controller 100 can maintain the surface coverage. Otherwise, if the NH3 amount is greater than or equal to the threshold, the controller 100 can decrease the reductant injection or the surface coverage to maximize the NOx conversion efficiency without exceeding the threshold.

In some cases, the controller 100 can be configured with a threshold NOx slip. For example, the controller 100 can compare the NOx amount downstream of the SCR catalyst 50 to the threshold NOx slip. If the NOx amount is less than (or equal to) the threshold, the controller 100 can maintain the surface coverage of ammonia. If the NOx amount is greater than or equal to the threshold, the controller 100 can increase at least the reductant dosage or the ammonia surface coverage.

In some implementations, the controller 100 can use the model 304 to track the formation of ammonium nitrate (e.g., a precursor for N2O). For example, the controller 100 can use the model 304 to track the formation of ammonium nitrate upstream, downstream, or at the SCR catalyst 50 (e.g., NOx reduction catalyst), among other sections of the aftertreatment system 22. The controller 100 can be configured to mitigate tailpipe N2O slip by minimizing ammonium nitrate surface coverage. The controller 100 can perform one or more operations in conjunction with FIG. 13 to minimize ammonium nitrate surface coverage, such as identifying tailpipe N2O via at least one tailpipe sensor or predicting the tailpipe N2O based on at least the engine out NOx, NOx measured at the tailpipe, and reductant injection rate over time. Based on the tailpipe N2O, the controller 100 can control combustion dynamics to control generation of the N2O output from the engine 20 to minimize the ammonium nitrate surface coverage. In some cases, the controller 100 can minimize the ammonium nitrate surface coverage by increasing SCR operating temperature, decreasing the reductant dosing rate, and/or decreasing NH3 availability to the SCR catalyst.

Due to chemical (e.g., chemical poison from sulfur in fuel) and thermal exposure, the SCR catalyst 50 or other catalysts of the aftertreatment system 22 may experience reversible and irreversible deactivation. For example, the SCR catalyst deactivation may be caused by at least strongly held sulfur or irreversible activity and storage loss due to temperature cycling in the presence of sulfur. Reversible deactivation can be recovered or reversed by a regeneration technique. Irreversible deactivation may not be recovered by the regeneration technique. The controller 100 can utilize any regeneration technique to reverse the catalyst deactivation, such as due to sulfur loading. The deactivation of the catalyst may be illustrated or described in conjunction with at least FIG. 5. The catalyst deactivation may be associated with the aging of the catalyst (e.g., usage over time), which can be represented by the NOx conversion efficiency.

The model 304 can evolve by taking into account the catalyst deactivation effects (sometimes referred to as catalyst aging effects). For example, the controller 100 can provide data associated with catalyst deactivation to the model 304. The data can include analysis of field-aged NOx reduction catalyst, such as NOx conversion efficiency based on at least one of the fuel consumption, temperature input, NOx value upstream of the SCR catalyst 50, reductant injection rate, ammonia surface coverage, and the NOx values downstream of the SCR catalyst 50. The analysis of the field-aged NOx reduction catalyst can include or indicate the effect of real-world catalyst degradation reflected in the decrease of NOx conversion efficiency or ability. Further, the effect of degradation may include an increase in NH3 slip from the model 304 (e.g., predicted NH3 slip downstream of the NOx reduction catalyst) due to progressive aging. Hence, the model 304 can incorporate the deactivation mechanisms deduced from analyzing field-aged NOx reduction catalysts to optimize NOx conversion and minimize NH3 slip.

The controller 100 can use the model 304 to control the reductant dosage based on the aging of the NOx reduction catalyst. The controller 100 can be adapted to the aging of the NOx reduction catalyst. The controller 100 can use the model 304 to generate or provide data associated with the analysis of field-aged NOx reduction catalyst to the control aging adaptation 316 (e.g., control aging adaptation module) configured to control the reductant storage 320. The control aging adaptation 316 may be a part of the controller 100 or dosing circuit 108 of the controller 100. The control aging adaptation 316 may control the NH3 storage manager 312 managing the reductant storage 320 to inject a predetermined amount of reductant from the reductant storage 320. For example, the model 304 can adapt individual active sites densities (e.g., components or sections of the aftertreatment system 22) to reflect the aging or degradation of the NOx reduction catalyst. Adapting the individual sites can include modifying the prediction of gas concentration upstream or downstream of the NOx reduction catalyst based on the boundary conditions (e.g., fuel consumption, inlet temperature, engine-out NOx, exhaust flow rate, or reductant injection rate, etc.).

Subsequent to adapting the model 304 based on the aging of the catalyst, the control aging adaptation 316 can determine a final (e.g., urea) dosing value for injection into the exhaust stream. The final urea dosing value may be greater than, less than, or the same as the urea dosing value provided by the NH3 storage manager 312. For example, if the control aging adaptation 316 determines an increase in NH3 slip due to aging of the catalyst, the control aging adaptation 316 may decrease the reductant dosage (e.g., decrease urea dosing value) or delay the NH3 storage manager 312 from injecting urea. Otherwise, if the control aging adaptation 316 determines a decrease of NOx conversion efficiency due to aging, the control aging adaptation 316 can increase the urea dosing value to increase NOx conversion ability. Hence, the controller 100 controlling the one or more components of the system 300 can increase or decrease reductant dosing based on NH3 storage capacity accounting for catalyst deactivation.

The controller 100 can provide the final urea dosing value to the model 304. The controller 100 can provide other measured values to the model 304, such as outlet NOx value or amount downstream of the NOx reduction catalyst. For example, controller 100 can provide the final urea dosing value or other measured values to the model 304 as feedback data. The model 304 can determine any deviation of the measured values to the predicted values. Accordingly, using the feedback data, the controller 100 can update the model 304 to account for catalyst degradation. In some cases, data from the model 304 may be virtual feedback for reductant dosing control operations or functions performed by the dosing circuit 108.

In some implementations, the controller 100 (or the modeling circuit 110) can determine the root cause for the degradation of the NOx reduction catalyst using the model 304. By determining the root cause, the controller 100 can provide a tool for diagnosing the degradation of the catalyst, such as addressing or resolving high sulfur fuel reductant doser or catalyst age. For example, the controller 100 can use the model to determine the rate of deactivation of the catalyst. The rate of deactivation may be based on the sulfur content. For instance, an increase in the sulfur content of the fuel can increase the rate of deactivation determined by the model 304. Thus, the controller 100 may determine the sulfur content as the root cause.

An increase in the deactivation of the catalyst may be associated with the decrease NOx conversion efficiency, an increase in NH3 slip, and/or an increase in tailpipe NOx amount out. The deactivation of the catalyst can include, refer to, or correspond to the degradation in the NOx conversion ability of the catalyst. In some cases, the deactivation of the catalyst may refer to a reduction in the quality or functionality of the catalyst. The increase in tailpipe NOx amount out may be associated with the decrease in NOx conversion efficiency. For example, with the same amount of reductant dosage and NH3 surface coverage, reducing the NOx conversion efficiency can increase the NOx outlet amount. By determining the rate of deactivation, the controller 100 (or the predictor circuit 111) can distinguish NOx slip and NH3 slip using the model 304. Using the model 304 can include processing the data that one or more circuits of the controller 100 provide to the model 304.

In some implementations, the controller 100 can determine and diagnose failures of one or more sensors of the aftertreatment system 22 by distinguishing NOx amount out and NH3 slip. For example, the controller 100 (or the predictor circuit 111) can provide a tool for identifying exhaust-gas sensor (e.g., NOx sensor, NH3 sensor, or other exhaust component multi-gas sensor) failure modes via prediction of NH3 slip. The controller 100 can use NH3 slip prediction to determine failures of other sensors. One or more circuits of the controller 100 may receive data from the exhaust-gas sensors measuring or estimating NOx or NH3 concentrations at one or more portions of the system 10. The controller 100 can compare the measured gas concentrations (e.g., NOx or NH3 concentration) to the predicted gas concentration upstream or downstream of the NOx reduction catalyst. The controller 100 can receive measurement data of the gas concentration from one or more sensors within the system 10. In some cases, the controller 100 (e.g., the predictor circuit 111) may predict the amount of gas concentration based on at least one of the temperature of the system 10, operation of the engine 20 (e.g., RPM, combustion, etc.), predicted condition of one or more components (e.g., DOC 30, DPF 40, SCR 50, etc.) of the system 10, among other historical data of the system 10. For instance, based on historical data associated with engine operation and actual gas concentration measured according to the engine operation, the controller 100 can predict that a predetermined gas concentration may be streamed into the exhaust pipe to one or more components of the system 10 based on at least the current engine operation. In some cases, the controller 100 can compare the predicted gas concentration to the measured gas concentration to calibrate or update the model 304 for aging adaptation.

In some implementations, the controller 100 may use the predicted gas concentration to identify the operational state of the exhaust-gas sensor. For example, the controller 100 can determine whether the predicted gas concentration is within a range or threshold of the measured gas concentration. The threshold may be predetermined by the administrator, such as within 1%, 2%, or 5% deviation from the predicted gas concentration. If the measured gas concentration exceeds the threshold of the predicted gas concentration, the controller 100, using the model 304, can determine a sensor failure. Upon detecting sensor failure, the notification circuit 109 of the controller 100 can notify the administrator or the client (e.g., vehicle operator) to perform maintenance or inspect the failed sensor. In some cases, upon detecting sensor failure, the controller 100 can recalibrate or reset the respective sensor. The controller 100 can detect and report a fault with at least one sensor by performing one or more operations in conjunction with at least FIG. 11.

In some implementations, the controller 100 can use the model 304 to guide the hydrocarbon injection during active regeneration of the particulate filter (e.g., the DPF 40). For example, the controller 100 can determine a threshold deactivation level (e.g., point at which to initiate a regeneration process due to degradation of the catalyst, which may be indicated by a NOx conversion efficiency below a predefined level) caused by sulfur poisoning (e.g., reversible or irreversible sulfur poisoning). The controller 100 may determine the threshold deactivation level based on results from historical regenerations, for instance, accounting for the least amount of time to regenerate while minimizing irreversible effects. For example, upon various regenerations of the catalyst from vehicles, the controller 100 can determine a point of NOx conversion efficiency to regenerate the catalyst, which does not or likely does not cause irreversible degradation of the catalyst.

In some cases, the controller 100 can determine the threshold based on at least the predicted outlet-gas concentration quantities. For example, the predictor circuit 111 can use the model 304 to predict the outlet-gas concentration downstream of the NOx reduction catalyst at various levels of NOx conversion efficiency. The controller 100 (e.g., dosing circuit 108) may adjust the reductant dosage amount (e.g., increasing or decreasing the dosage or ammonia surface coverage) to satisfy a gas concentration amount threshold based on the predicted gas concentration from the predictor circuit 111. The gas concentration threshold may indicate an allowable NH3 slip or NOx outlet amount from the exhaust pipe (e.g., pipe 26). In some cases, due to the decrease of NOx conversion efficiency below a point, the predictor circuit 111 may predict that adjusting the dosage or other parameters (e.g., temperature or exhaust flow rate) may not satisfy the gas concentration threshold. Accordingly, the modeling circuit 110 can use the prediction from the predictor circuit 111 to determine the deactivation level threshold for regenerating the particulate filter to lower the gas concentration downstream of the catalyst.

In some cases, the predictor circuit 111 can determine the irreversible sulfur poisoning level throughout a predefined time period. For example, the NOx reduction catalyst may incur or experience reversible and irreversible sulfur poisoning progressing linearly over time. In some cases, the reversible or irreversible sulfur poisoning may progress nonlinearly over time (e.g., exponentially, logarithmically, etc.). In this case, the predictor circuit 111 can set a threshold based on an irreversible deactivation threshold, such as 0.5%, 0.7%, 1%, among other degradation values. In some implementations, the threshold deactivation level may be configured by the administrator of the system 300.

The controller 100 can configure the timing and amount of hydrocarbon dosing/injection based on the deactivation level of the catalyst and the threshold deactivation level configured for the catalyst. For example, the controller 100 can monitor or predict the deactivation level of the catalyst based on a comparison between the upstream and downstream gas concentration of the catalyst (e.g., conversion efficiency). In response to reaching the threshold (e.g., exceeding or dropping below the threshold), the controller 100 can inject the hydrocarbon into the exhaust stream. Hence, the controller 100 can perform the injection upon the catalyst degrading below a threshold. The amount of hydrocarbon dosing can be based on the level of sulfur poisoning (e.g., sulfur load). The controller 100 can inject the amount of hydrocarbon to regenerate the reversible portion of the particulate filter. The amount of hydrocarbon may correspond to a duration of hydrocarbon injection. Hence, the controller 100 can use the model 304 to determine the threshold deactivation level for triggering a hydrocarbon dosing event. Injecting the hydrocarbon can increase the temperature of the catalyst (e.g., SCR catalyst 50 or the particulate filter) to desorb weakly bound sulfur. In response to the desorption of the bounded sulfur on the catalyst, the NOx conversion performance can be recovered. Accordingly, the controller 100 using the model 304 can optimize the frequency and duration of active regenerations for one or more components of the system 10, such as the catalyst or filter (e.g., particulate filter), thereby minimizing irreversible deactivation of the catalyst based on the tracking of real-world deactivation mechanisms.

In some implementations, the predictor circuit 111 can track the permanent changes in SCR activity during field aging as a function of or based on the number of active and/or passive regenerations and cumulative fuel consumption. The cumulative fuel consumption can reflect catalyst exposure to sulfur, among other chemicals. In some cases, the number of active and/or passive regenerations may reflect changes of irreversible deactivation, such that a higher number of active generations performed can indicate a greater cumulative effect of irreversible deactivation. The correlation of the number of active and/or passive regenerations and cumulative fuel consumption to NOx conversion performance can reflect the dynamic changes in the performance of the NOx reduction catalyst during field aging.

In some implementations, the predictor circuit 111 can provide data of catalyst degradation as feedback to the model 304 for improving and optimizing engine operation. For example, the predictor circuit 111 can determine the state of the catalyst 50 (e.g., NOx conversion performance). The predictor circuit 111 can provide feedback data to the model 304 to determine an adjustment of the engine operation based on the catalyst state. For example, the engine circuit 105 using the model 304 can set varying engine-out NOx values based on the degradation level of the catalyst 50. The engine circuit 105 may reduce engine-out NOx value for low NOx conversion performance. The engine circuit 105 may increase or maintain engine-out NOx value for high NOx conversion performance. The increase or decrease engine-out NOx value may be incrementally adjusted over the evolving course of the catalyst state. For example, the controller 100 can adjust the engine-out NOx by increasing or decreasing the combustion of the engine (e.g., adjusting RPM of the engine or temperature of the exhaust gas), initiate gas recirculation to reduce NOx output to one or more components of the system 10, etc.

In some implementations, the predictor circuit 111 can use the catalyst state or performance based on the model 304 to optimize fuel and reductant dosing consumption. For example, the predictor circuit 111 can identify engine operating points (e.g., engine speed and/or engine load controlled or influenced by one or more parameters, such as fueling rate, among others) in response to catalyst degradation. The predictor circuit 111 can provide an instruction to the engine circuit 105 to adjust fuel consumption or NOx value based on the catalyst degradation (e.g., decrease fuel consumption or engine-out NOx value in response to a low catalyst performance). The predictor circuit 111 can provide an instruction to the dosing circuit 108 to adjust the reductant dosage amount based on the catalyst degradation. For example, the dosing circuit 108 can increase reductant dosage in response to low catalyst performance. In another example, with a high amount of NH3 surface coverage or high catalyst performance, the dosing circuit 108 may reduce or maintain the volume of reductant dosage.

In some implementations, the controller 100 can correct the NH3 and ammonium nitrate storage predictions of one or more modules of the modeling circuit 110 by using inputs from an onboard absorbed NH3 and ammonium nitrate measuring device. The onboard device can include at least one of a radio frequency sensor, impedance spectrometer, X-ray fluorescence device, tunable diode laser absorption spectroscopy (TDLAS), etc. Correcting the module may include configuring or providing updated input to the module for processing or learning. In some implementations, to correct outlet NO and/or NO2 predictions (e.g., predicted by the predictor circuit 111 using one or more modules), the controller 100 can use an onboard (or remote) chemiluminescence analyzer, among other devices. For instance, the controller 100 can use the chemiluminescence analyzer to measure the output gas concentration (e.g., NO or NO2). Using the measurement, the controller 100 can compare the measured to the predicted gas concentration value. Based on the differences, the controller 100 can correct one or more module or model 304 making the prediction accordingly.

In some implementations, the real-world deactivation of the catalyst (e.g., degradation of the catalyst) can be based on or as a function of at least temperature, time (e.g., age), fuel consumption, oil consumption, active regeneration frequency, active regeneration duration, engine operation, etc. Based on the aforementioned function, the controller 100 can calibrate the model 304 to determine the performance of the catalyst accounting for the aging of the catalyst, such as discussed herein. For instance, the controller 100 can determine the degradation of the catalyst due to exposure to high temperature, how the catalyst is regenerated (e.g., duration and frequency), among other factors to improve the predicted performance of the catalyst as a function of real-world usage. The controller 100 can update the model 304 or one or more modules in real-time based on the activities or state of the catalyst.

In some implementations, the controller 100 can minimize permanent and temporary sulfur poisoning of the catalyst by modification of the active regeneration frequency, active regeneration temperature, active regeneration duration, hydrocarbon dosing during active regenerations, dynamic control of ammonium nitrate coverage, etc. The controller 100 can configure the modification based on historical data of regenerations performed on the catalyst or other catalysts of various vehicles and operating conditions, e.g., to correlate and identify an optimal modification for the catalyst of the vehicle. Similarly, for instance, the controller 100 can minimize real-world deactivation of the catalyst by modifying the active regeneration frequency, active regeneration temperature, active regeneration duration, and/or hydrocarbon dosing during active regenerations, etc. In some implementations, the controller 100 can use a timer-based off-board heat treatment (e.g., device external from the aftertreatment system 22) to remove absorbed sulfur (e.g., permanent and/or temporary absorbed sulfur) on the catalyst. The controller 100 can initiate the heat treatment based on predictions from the module, such as a point of the deactivation level to heat the catalyst.

In some implementations, the controller 100 can use the model 304 for diagnosing the catalyst degradation root cause, such as determining the high sulfur fuel, reductant doser failure, and/or catalyst aging, etc. as part of the cause of the catalyst degradation based on one or more sensors of the system 10 and prediction from the predictor circuit 111, for example. In some cases, the controller 100 can include a module for diagnosing NOx sensor, NH3 sensor, or exhaust component multi-gas sensor failure modes, such as described in conjunction with at least FIGS. 7 and 11. In some cases, the controller 100 can gauge, determine, or predict the amount of tailpipe NOx or N2O. Based on the determined amount, the controller 100 can correct the reductant dosing upstream of the catalyst to optimize the trade-off between the tailpipe NOx or N2O.

In some cases, the controller 100 can diagnose the health of upstream oxidizing catalytic components by observing the gas composition at the inlet of NOx reduction catalyst using model-based input estimation strategy, such as an unknown input observer. The controller 100 may adjust reductant delivery strategy based on the feed gas composition from the output of the unknown input observer at the inlet of the catalyst. In some cases, the controller 100 can adjust thermal management post awareness of identified states of the upstream oxidizing catalytic components, such as to optimize feed gas composition entering the catalyst for conducive NOx conversion conditions. For instance, the controller 100 can adjust the thermal of the exhaust gas to maintain or reduce gas concentration (e.g., NOx concentration) to accommodate for the catalyst condition (e.g., conversion ability).

In some implementations, the controller 100 can adjust the reductant delivery based on predictions of future system inputs, such as vehicle navigation system, vehicle traffic information, engine speed, fuel consumption, etc., and/or corresponding impact on vehicle system performance. The future system inputs can be based on data from remote devices, such as traffic on the route, which the vehicle will be navigating to. Based on the predicted inputs, the controller 100 can adjust reductant delivery, such as increasing reductant dosing during high engine operation, and reducing the dosing during low engine operation. In some cases, the controller 100 can use an onboard physical multi-gas species sensor to measure the gas concentration along the exhaust pipe of the system 10. In some implementations, the controller 100 can adjust the reductant delivery upstream of the catalyst using measurements from the onboard physical multi-gas species sensor in combination with at least one of the modules.

Referring now to FIG. 4A, depicted is an illustration of a model 400 represented by various continuously stirred tank reactors (CSTRs), according to an example embodiment. The model 400 may be managed by the modeling circuit 110. The model 400 can correspond to, include, or be a part of the model 304. For example, the model 400 can perform one or more features or functionalities of the model 304. The model 400 can represent a simplified reduced-order model that can be solved in the ECM or by the controller 100.

The modeling circuit 110 can represent the model 400 as a numerical model 404. The numerical model 404 may be a 3D representation of a catalyst, such as the SCR catalyst 50, among other catalysts. The modeling circuit 110 can convert the numerical model 404 to a single channel 408. The channel 408 can represent the length or depth of the catalyst. For example, the numerical model 404 may include various channels. The modeling circuit 110 can assume that the channels of the numerical model 404 are the same and modify the numerical model 404 to the channel 408.

The modeling circuit 110 can convert the channel 408 into a combination of CSTRs 412. The individual CSTRs 412 can correspond to sections or portions of the channel 408. For example, each CSTR can be a section or subsection of the channel 408. The CSTR can be associated with a value representing the performance of the catalyst, such as NH3 coverage, a subset of NOx conversion efficiency, cumulative NOx, etc. For example, the modeling circuit 110 can accumulate, aggregate, or combine CSTRs 412 of the model 400 to determine the state, performance, or NOx conversion efficiency of the SCR catalyst 50. The modeling circuit 110 can convert the channel 408 to a combination of CSTRs 412 using a dimension reduction technique. The CSTRs 412 may be zero-dimension blocks placed in series to represent the channel 408.

The predictor circuit 111 can use the model 400 represented as CSTRs 412 to predict at least the state of the catalyst and the output from the catalyst (e.g., values downstream of the catalyst). For example, the predictor circuit 111 can provide input data to the model 400, such as temperature solution (e.g., gas temperature or solid temperature), engine-out NOx prediction, exhaust flow rate, and/or fuel consumption. The model 400 can process the data to determine the outlet concentration and/or amounts of the relevant gas constituents, such as NO, NO2 NO3, NH3, N2O, etc. In some cases, based on the input data, the model 400 can determine the surface coverage of ammonia at different CSTRs 412. The state of the catalyst may be based on the cumulative states of individual CSTRs 412. For example, each CSTR can include a value of the ammonia surface coverage or storage associated with NOx conversion ability (e.g., conversion between NOx and NH3 based on historical data or input data into the model 400).

The predictor circuit 111 can determine the conversion value or ability of each CSTR section of the CSTRs 412. The predictor circuit 111 can determine, based on the values of the CSTRs 412, the outlet concentration and/or amounts in response to receiving the inlet gas concentration and/or amount. The modeling circuit 110 can update the model 400 in response to comparing the predicted output to the measured output, thereby adapting the model 400 to the evolving state of the catalyst.

Figure 4B:
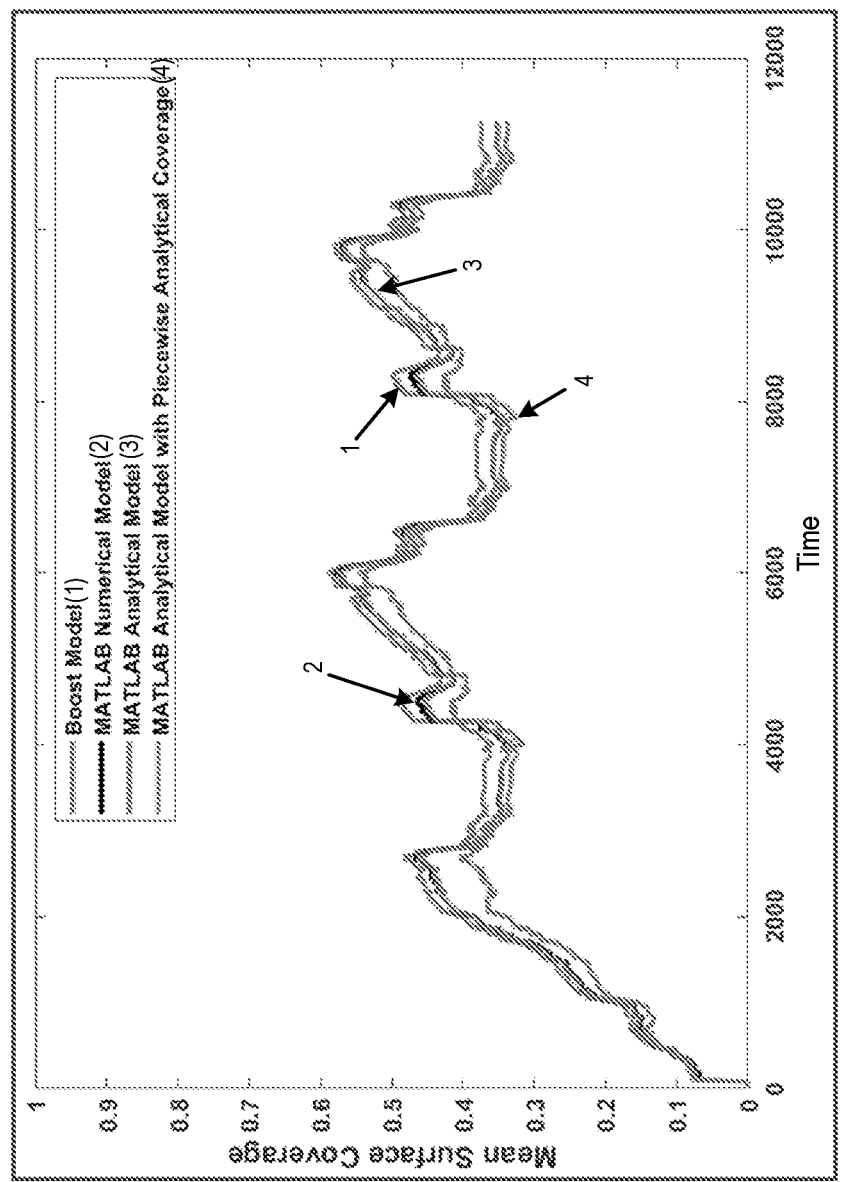
FIG. 4B is an example plot of surface coverage of a catalyst of an exhaust aftertreatment system, according to an example embodiment.

Referring now to FIG. 4B, depicted is a plot 420 of surface coverage of the catalyst, according to an example embodiment. The plot 420 can illustrate the mean surface coverage of a chemical over time. For example, the plot 420 may illustrate NH3 mean surface coverage using the different models. The models can include at least a boost model, numerical model, analytical model, or analytical model with piecewise analytical coverage. The time represented in the x-axis may be in seconds, minutes, etc.

Figure 4C:
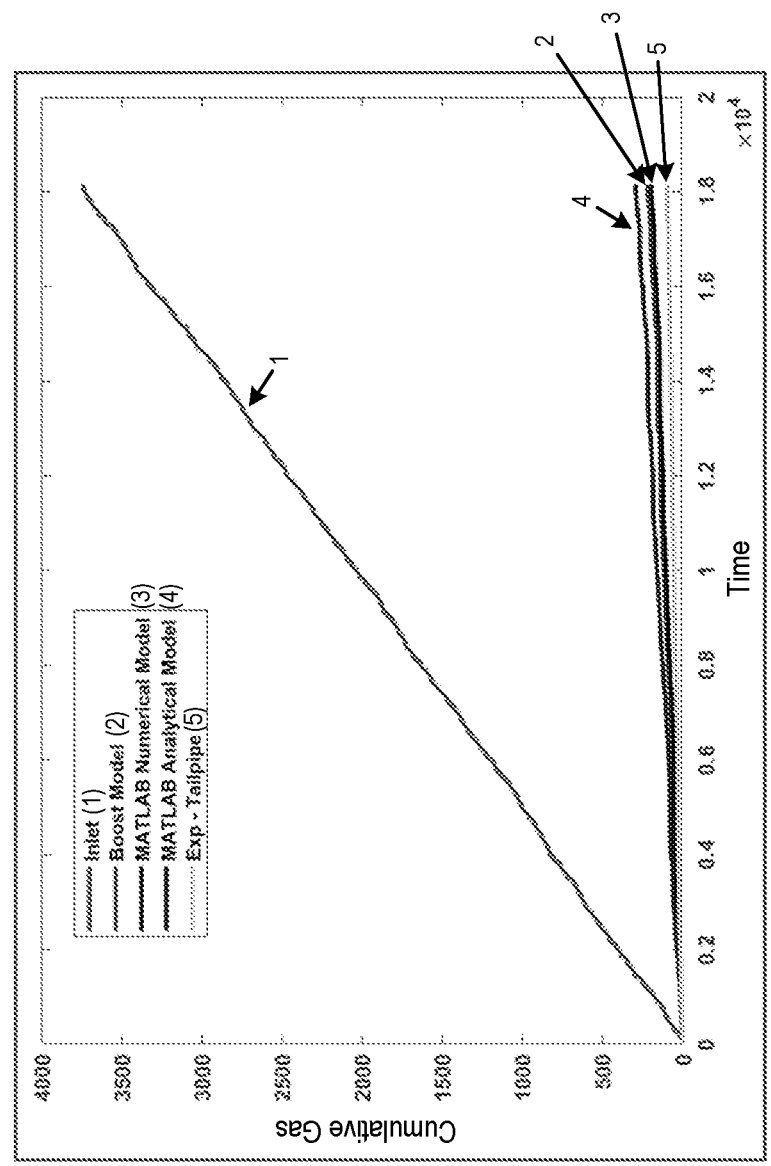
FIG. 4C is an example plot of a cumulative gas over time, according to an example embodiment.

Referring to FIG. 4C, depicted is a plot 430 of a cumulative gas over time, according to an example embodiment. The cumulative gas can correspond to cumulative NOx. In some cases, the cumulative gas may correspond to other gases, such as NH3. The time may be in seconds, minutes, etc. For example, the cumulative gas may increase linearly over time. The plot 430 can illustrate at least the cumulative gas at the inlet, cumulative gas using boost model, numerical model, or analytical model, and the cumulative gas experienced by the tailpipe. The cumulative gas experienced at the tailpipe may reflect the usage of model 304 or 400 to account for the aging of the SCR catalyst 50.

Figure 5:
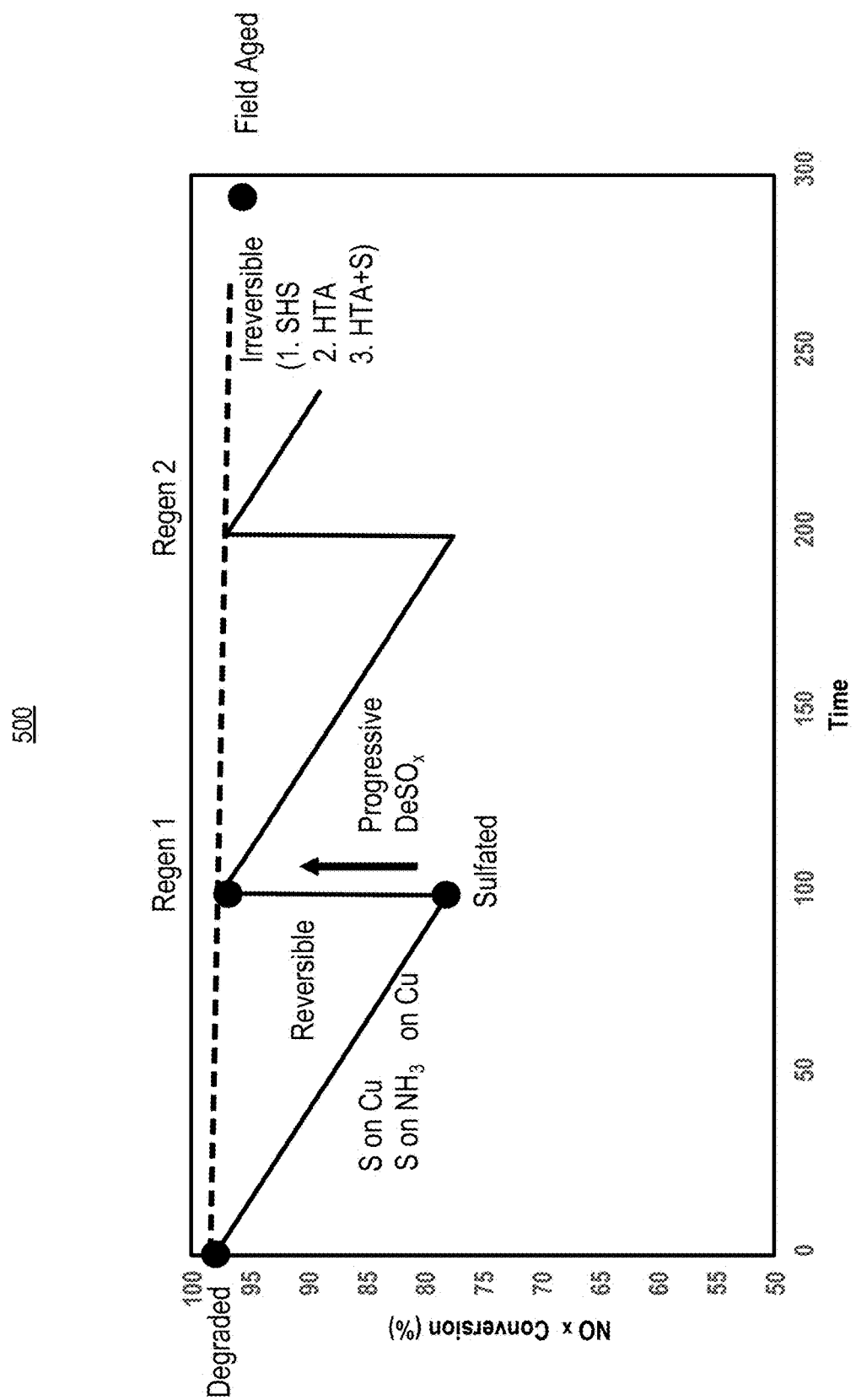
FIG. 5 is an example plot illustrating the impact of sulfur loading and aging on a catalyst of the exhaust aftertreatment system, according to an example embodiment.

Referring to FIG. 5, depicted is a plot 500 illustrating the impact of sulfur loading and aging on the catalyst, according to an example embodiment. The plot 500 can include the NOx conversion ability (e.g., a ratio of inlet to outlet NOx) over time. The time may be in hours, days, etc. The plot 500 can represent the predicted NOx conversion performance adjusted for aging by the controller 100 (or the predictor circuit 111). For example, a new SCR catalyst 50 may provide a 99% NOx conversion performance at 0 hours. Through the progressive use of the SCR catalyst 50, the SCR catalyst 50 may incur reversible deactivation (e.g., represented by solid line) or irreversible deactivation (e.g., represented by dashed line). The deactivation may be caused by the accumulation of sulfur (S) on copper (Cu) or sulfur on Cu and NH3.

The controller 100 can track sulfur loading data based on at least fuel consumption and the sulfur concentration of the fuel. The controller 100 can use the tracked data to determine the NOx conversion degradation over time. The controller 100 may set a threshold deactivation level. For example, the controller 100 can set the threshold at 77% NOx conversion efficiency. In response to reaching the threshold at the 100-hours, the controller 100 can determine that the catalyst is sulfated and perform a progressive DeSOx process. The DeSOx process may be referred to as an active regeneration process. In response to initiating DeSOx, the controller 100 can recover at least the reversible deactivation portion of the catalyst. Due to the irreversible deactivation, the performance of the catalyst may be degraded to 98% conversion efficiency at the first regeneration. In response to a second sulfated event, the controller 100 can initiate a second regeneration process. Subsequent to the second regeneration, the controller 100 can recover the catalyst to 97% NOx conversion performance.

The controller 100 can predict the reversible and irreversible deactivation level of the catalyst due to field age. Based on the catalyst performance, the controller 100 can predict an output of the catalyst to evolve with the field age. Using the model 304, the controller 100 can optimize the frequency and duration of hydrocarbon dosing to minimize irreversible deactivation. Accordingly, the controller 100 can predict the performance (e.g., load temperature performance or NOx conversion performance) deactivation of the SCR catalyst 50. In some cases, the controller 100 can determine the performance of other components (e.g., DOC 30, DPF 40, etc.) similar to the performance of the SCR catalyst 50.

Figure 6:
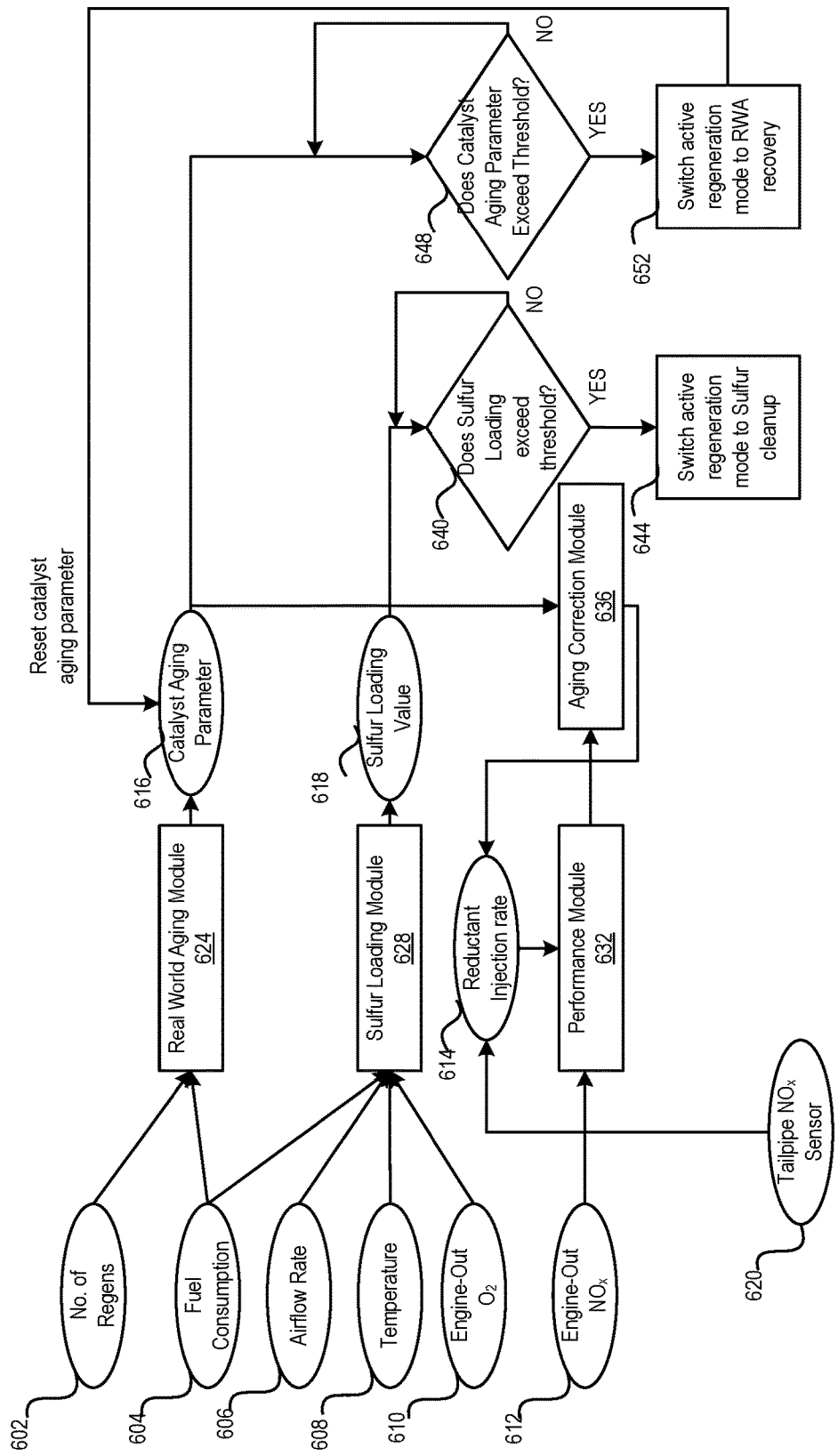
FIG. 6 is a flow diagram for minimizing sulfur loading and real-world aging (RWA) deactivation, according to an example embodiment.

Referring to FIG. 6, a flow diagram 600 for minimizing sulfur loading and real-world aging (RWA) deactivation is shown, according to an example embodiment. The one or more operations discussed herein may be performed, executed, or operated by the controller 100 in conjunction with the components discussed herein in conjunction with at least FIGS. 1-4A.

The controller 100 can track or retrieve data (e.g., historical data) of the components of the aftertreatment system 22. The controller 100 can obtain the data (e.g., input data) from one or more sensors of the system 10. In some cases, the data can include historical data. For example, the data can include at least the number of regenerations (602) (e.g., number of active regeneration performed on a catalyst, such as the SCR catalyst 50), fuel consumption (604), airflow (606) (e.g., exhaust flow rate), temperature (608) (e.g., the temperature at the inlet or outlet of the catalyst or temperature of the exhaust gas), engine-out oxygen (O2) (610), engine-out NOx (612), reductant injection rate (614), or tailpipe NOx sensor (620). Further, the data can include performance information of one or more catalysts of the aftertreatment system 22 and values from at least one sensor upstream or downstream from the catalyst during a predefined time period.

In some other cases, the input data can reflect the operations of the engine 20 or one or more components of the aftertreatment system 22. For example, adjusting the input data may include modifying the engine operation, such as changing fuel consumption (604) of the engine 20, airflow rate (606), temperature (608), etc. In some cases, the data (e.g., engine-out NOx (612), tailpipe NOx sensor (620), engine-out 02 (610), etc.) can include or correspond to prediction data determined by the controller 100. For example, the controller 100 can predict the engine-out NOx data 612 based on at least one of fuel consumption, temperature downstream of the engine 20, or sulfur content of the fuel. In some cases, the data can include or correspond to measured data received from one or more sensors of the system 10, among other components capable of taking measurement.

In some implementations, the operation time (i.e., predefined time period) may be associated with the number of regenerations, an aging value (e.g., rate of aging from beginning to end of the time period), and/or the sulfur loading of the catalyst over the time period. For example, the operation time, in addition to the fuel consumption, the sulfur concentration of the fuel, and airflow rate can reflect the accumulation of sulfur loading or an increase in deactivation level. In this case, the operation time can include a deactivation level or degradation performance of the catalyst.

The controller 100 can receive and feed data regarding one or more components of the vehicle including at least one of the number of regeneration (602), fuel consumption (604), airflow rate (606), temperature (608), engine-out O2 (610), engine-out NOx (612), tailpipe NOx sensor (620), reductant injection rate (614), etc. to one or more modules, such as the real-world aging module, sulfur loading module, performance module, or aging correction module. In some cases, the one or more modules can receive or retrieve data from a data repository or memory 115 of the vehicle or the controller 100. The one or more modules (e.g., real-world aging module, sulfur loading module, performance module, aging correction module, or other modules discussed herein) can include or correspond to the one or more modules (e.g., real-world aging module 112, sulfur loading module 113, performance module 114, correction module 116, optimization module 117, etc.) of the controller 100 (e.g., the modeling circuit 110). The one or more modules can perform operations, features, or functionalities discussed herein to at least account for aging of the catalyst and control the reductant dosing. The one or more modules discussed herein may be a part of the model 304, model 400, or a single module. In some cases, one or more modules may be independent modules separate from the model 304. The modules may be local to or external from the controller 100.

For example, at process 624, the controller 100 can provide the number of regenerations (602) and the fuel consumption (604) to the real-world aging module (e.g., real-world aging module 112). The real-world aging module can receive information regarding at least the number of regenerations (602) and the fuel consumption (604), among other data discussed herein. The fuel consumption (604) can be used to determine the aging effect on the SCR catalyst 50. The real-world aging module can track the change in the catalyst state as a function of real-world aging. For example, the real-world aging module can determine the amount of fuel consumed by the engine 20, which can reflect the aging or usage of the catalyst (based on, for example, a sulfur content in the amount of fuel consumed). The real-world aging module can correlate the fuel consumption with the amount of deactivation level of the catalyst. In some cases, the initial level of catalyst performance (e.g., NOx conversion efficiency) can be based on the number of regenerations experienced by the catalyst. For example, as the number of active regenerations increases, the irreversible deactivation level may also increase over time. Hence, based on the regeneration (602) and the fuel consumption (604), the real-world aging module can set a catalyst aging parameter (616), which can reflect the deactivation level or the conversion efficiency.

The catalyst aging parameter (616) can reflect the irreversible and reversible deactivation level of the catalyst. The controller 100 can compare the aging parameter 616 to a threshold. In some cases, the threshold may be predetermined by the administrator of the operator I/O device 120 or the controller 100. In some other cases, the controller 100 can determine the threshold using the model 304, based on at least the predicted value downstream of the SCR catalyst 50. For instance, the controller 100 can retrieve a model 304 of a catalyst of the aftertreatment system 22 from a memory. The model 304 may be generated by the controller 100 or a remote device based on at least historical data from at least one sensor upstream (e.g., temperature sensor 16 or 18, NOx sensor 12 or 55, data from the engine 20, etc.) of the catalyst and at least one sensor downstream of the catalyst (e.g., NOx sensor 57 or 14, temperature sensor 18, etc.).

At process 648, in response to comparing the catalyst aging parameter (616) to a threshold, the controller 100 can determine whether the catalyst aging parameter (616) exceeds the threshold. The controller 100 can compare the catalyst aging parameter (616) to the threshold in response to receiving an update from the real-world aging module. In some cases, the controller 100 can compare the catalyst aging parameter (616) to the threshold at a time interval, such as hourly, daily, weekly, etc. The real-world aging module can continuously or progressively update the catalyst aging parameter (616), such as decrementing NOx conversion performance based on the input data. For example, if the catalyst aging parameter (616) does not exceed the threshold, the controller 100 can compare the catalyst aging parameter (616) to the threshold at a different time. In another example, if the catalyst aging parameter (616) exceeds the threshold, the controller 100 can proceed to switch the active regeneration model to RWA recovery, such as at process 652.

At process 652, the controller 100 can perform/command an active regeneration to the catalyst in response to the catalyst aging parameter (616) exceeding the threshold. The active regeneration mode can be switched to RWA recovery in process 652. The active regeneration can be performed by injecting hydrocarbon into the exhaust stream to recover the catalyst. In some cases, the active regeneration can be performed through late fuel injection in the combustion chamber. The RWA recovery can represent a deep clean of the catalyst, such as a higher SCR temperature setting (e.g., 575 Celsius) compared or relative to an active regeneration temperature setting (e.g., 540 Celsius). The controller 100 can regenerate at least the reversible deactivation level of the catalyst, or a portion thereof. The controller 100 can account for the irreversible deactivation level. For example, subsequent to the regeneration, the number of regeneration (602) can be updated. The controller 100 can reset the reversible deactivation level of the catalyst aging parameter (616). The controller 100 can repeat the regeneration process in response to the catalyst aging parameter (616) exceeding the threshold.

In some implementations, the controller 100 can provide the catalyst aging parameter (616) to the aging correction module as input data. The controller 100 can provide the catalyst aging parameter (616) as an input in response to the real-world aging module 626 determining or updating the catalyst aging parameter (616). In some cases, the controller 100 can provide the catalyst aging parameter (616) at a time interval to update the aging correction module.

At process 628, the controller 100 can provide the fuel consumption (604), airflow rate (606), temperature (608), and engine-out 02 (610) data/values to the sulfur loading module. For example, the sulfur loading module (e.g., sulfur loading module 113) can receive information regarding at least the fuel consumption (604), airflow rate (606), temperature (608), and engine-out 02 (610). The sulfur loading module can be configured to track the changes in sulfur content or sulfur loading on the catalyst based on this information. The sulfur loading module can track the permanent and temporary sulfur loading of the catalyst during real-world aging. Permanent sulfur loading can include strongly held sulfur on the catalyst (e.g., may not be removable). Temporary sulfur loading can include weakly held sulfur on the catalyst that can be removed. Based on the fuel consumption, the sulfur content of the fuel, airflow rate, temperature, and engine-out O2, the sulfur loading module can determine an increase in sulfur loading on the catalyst over time. The amount of sulfur loading can be represented as sulfur loading value (618). The sulfur loading module can update the sulfur loading value (618) at a time interval or progressively in response to the engine fuel consumption.

The controller 100 can determine whether the sulfur loading exceeds a threshold (e.g., sulfur loading threshold) (640). The sulfur loading threshold can be predetermined by the administrator or determined by the controller 100 using the model 304. For instance, the controller 100 can use the model 304 to determine an amount of sulfur build-up that causes the NH3 slip or NOx conversion efficiency to exceed the respective threshold, even with reductant dosage adjustment. The controller 100 can compare the sulfur loading value (618) to the sulfur loading threshold to determine whether to perform active regeneration, as in process 644.

The controller 100 may determine that the sulfur loading value (618) does not exceed the threshold. In this case, the controller 100 may continue monitoring the sulfur loading value (618). The controller 100 can perform a second check or comparison between sulfur loading and the threshold in response to an update to the sulfur loading value (618) or at a predetermined time interval. At process 644, if the sulfur loading value (618) exceeds the threshold, the controller 100 can switch active regeneration mode to sulfur cleanup. For example, the controller 100 can initiate active regeneration of the sulfur in response to sulfur loading exceeding the threshold. To clean sulfur from the catalyst, the controller 100 can command a hydrocarbon injector (e.g., or a source storing the hydrocarbon) to inject hydrocarbon to increase the temperature of the catalyst. By increasing the temperature of the catalyst, weakly bonded sulfur can be removed or released from the catalyst. The sulfur loading module can monitor the sulfur loading of the catalyst throughout the usage of the aftertreatment system 22.

The controller 100 can control and monitor the reductant injection rate of the doser 56. The injection rate (614) can be updated or configured based on the tailpipe NOx sensor (620) (e.g., tailpipe NOx measurement data) indicating the NOx value downstream from the catalyst. In some cases, the reductant injection rate (614) may be used to control the reductant injection rate. At process 632, the controller 100 can provide information regarding at least the engine-out NOx (612) and the reductant injection rate (614) (e.g., including the tailpipe NOx sensor (620)) to the performance module (e.g., performance module 114). The performance module can receive information regarding at least the engine-out NOx (612) and the reductant injection rate (614), among other data to determine the performance of the catalyst. For example, the performance module can use the data associated with NOx output from the engine 20, the reductant dosage supplied or injected, and the amount of NOx detected downstream from the catalyst. Based on the initial NOx value (e.g., engine-out NOx), NH3 value for NOx reduction, and the measured NOx after the reduction, the performance module can determine the performance of the catalyst (e.g., NOx reduction catalyst performance or SCR catalyst 50). The performance module can track the performance over time and provide the monitored data to the aging correction module.

The aging correction module can predict the degradation of one or more catalyst functions and performance as a function of RWA. The aging correction module can receive data from at least the performance module and the catalyst aging parameter (616). The performance module may provide data on the NOx conversion performance of the catalyst as measured by at least one sensor upstream of the catalyst and at least one sensor downstream of the catalyst. The catalyst aging parameter (616) may indicate at least the deactivation level of the catalyst based on RWA. The aging correction module can account for the performance of the catalyst (or other components of the aftertreatment system 22) to determine a reductant dosage duration, rate, or otherwise amount.

The aging correction module can provide a prediction of reductant injection rate (614) to achieve a NOx value downstream of the catalyst. For example, based on data from the performance module and the catalyst aging parameter (616), the aging correction module can predict varying NOx values at the tailpipe based on different reductant injection rates. The aging correction module can determine or select an injection rate that satisfies the outlet NOx value threshold, such as below 15 ppm, between 10 to 15 ppm, etc. Accordingly, the aging correction module can provide the reductant injection rate (614) to control the doser 56 to inject the desired reductant amount. The controller 100 can compare the predicted to the measured (e.g., by tailpipe NOx sensor) NOx value at the tailpipe to update the reductant injection rate 614. Accordingly, by correcting the reductant injection rate based on the aging of the catalyst or other components, the controller 100 can optimize NOx conversion and minimize NH3 slip via updating the aging effect to the catalyst.

In some implementations, the controller 100 can predict a first value to be sensed by the sensor upstream of the catalyst and a second value to be sensed by the sensor downstream of the catalyst using the model 304. For example, the first value can represent the NOx value upstream of the catalyst and the second value can represent the NOx value downstream of the catalyst. In some cases, the first value and the second value can represent the NH3 value upstream or downstream of the catalyst, respectively. In some cases, to predict the second value, the controller 100 may provide a first value to the model 304, which can be a measurement of the inlet NOx value. The model 304 can determine, based on at least the measured first value (e.g., engine-out NOx) and the reductant dosage level, a second value representing the amount of NOx to be measured at the tailpipe.

The controller 100 can control the reductant dosing from a doser based on the predicted second value. For example, the controller 100 can determine to decrease the second value downstream of the catalyst. In this case, the controller 100 may increase the reductant dosage to increase the NOx and NH3 conversion or mix. In another example, the controller 100 can determine that the second value satisfies a first threshold (e.g., NOx level threshold), but does not satisfy a second threshold (e.g., NH3 slip threshold). In this example, the controller 100 may decrease the reductant injection rate to satisfy the first threshold and the second threshold.

In some implementations, the controller 100 can increase the reductant dosing from the doser in response to an operation time greater than a threshold. For example, the operation time can be associated with the performance of the catalyst (e.g., determined by the performance module) or the catalyst aging parameter (616). The controller 100 may determine that the operation time is greater than an operation time threshold (e.g., a first threshold) to improve NOx conversion or minimize NOx outlet amounts (e.g., at the tailpipe). In another example, the controller 100 may determine that the number of regenerations is greater than a regeneration threshold (e.g., a second threshold), which can reflect the irreversible deactivation level. In this example, the controller 100 can increase the reductant injection rate to account for the irreversible deactivation level. In some cases, the operation time may be associated with reversible and irreversible deactivation levels, at least in part.

In some cases, the controller 100 may decrease the reductant dosing. For example, the controller 100 may initiate or identify an initiation of an active regeneration of the catalyst to recover or regenerate the catalyst performance. In response to the regeneration of the catalyst, the controller 100 can decrease the reductant injection rate. The controller 100 can decrease the reductant injection rate based on or taking into account the operation time and the number of regeneration that the catalyst experienced. Accordingly, based at least on the operation time and the number of regenerations, the controller 100 can determine the NOx conversion efficiency after catalyst recovery to adjust the reductant dosing.

In some implementations, the controller 100 can control the reductant dosing from the doser 56 at a future time period based on the predicted second value. For example, the controller 100 can predict the upstream and downstream NOx values at a future time period. The controller 100 can control the reductant dosing at the future time period to achieve the predicted second value. In some cases, responsive to controlling the reductant dosing at the future time period, the controller 100 can receive or identify a third value (e.g., measured NOx value) sensed by at least one sensor (e.g., NOx sensor) downstream of the catalyst. The controller 100 can compare the measured value to the predicted value or a threshold (e.g., NOx conversion or NH3 slip threshold). The controller 100 can adjust, based on the historical data (e.g., state data or input data) and the comparison, the model 304 to correct the deviation between the predicted and measured data. Accordingly, the controller 100 can use the adjusted model 304 to control the reductant dosing from the doser to satisfy the threshold at a subsequent time period.

Figure 7:
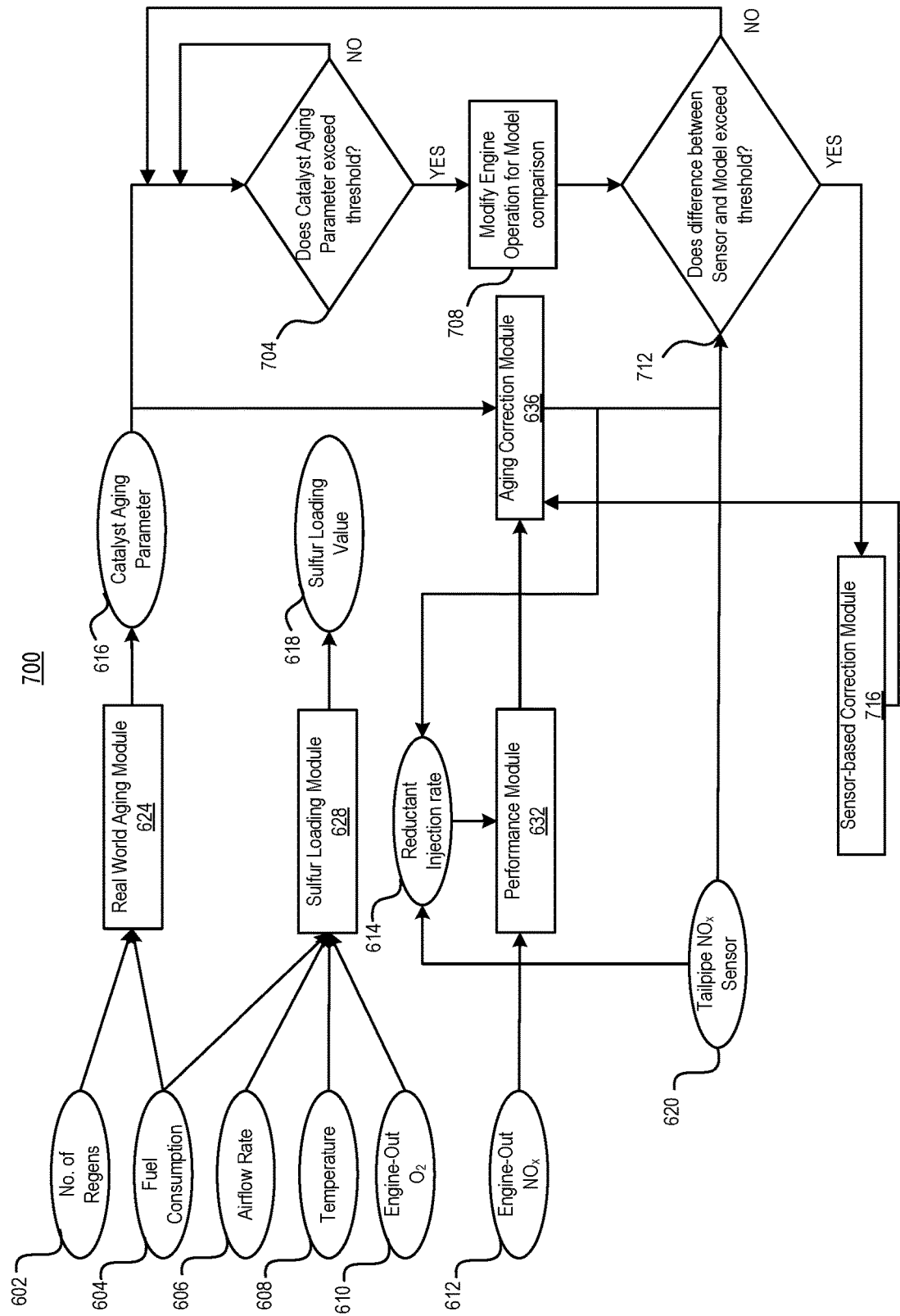
FIG. 7 is a flow diagram for correcting a model and reductant dosing based on sensor information, according to an example embodiment.

Referring to FIG. 7, depicted is a flow diagram 700 for correcting a model 304 and reductant dosing based on the sensor, according to an example embodiment. The one or more operations discussed herein may be performed, executed, or operated by the controller 100, the operator I/O device 120, the one or more circuits of the controller 100, one or more components (e.g., model 304, Kalman filter 308, NH3 storage manager 312, etc.) of the system 300, or other components discussed herein in conjunction with at least FIGS. 1-4A. The certain operation(s) discussed herein may be associated with other operations as described in conjunction with at least FIG. 6.

For example, the real-world aging module can receive information regarding the number of regeneration (602) and fuel consumption (604) to determine the catalyst aging parameter (616). At process 704, the controller 100 can compare the catalyst aging parameter (616) to a threshold. At least a part of process 704 may be similar to process 648. If the catalyst aging parameter (616) does not exceed the threshold, the controller 100 can perform another comparison at a different time interval or in response to an updated catalyst aging parameter (616) by the real-world aging module. If the catalyst aging parameter (616) exceeds the threshold, the controller 100 can proceed to process 708.

At process 708, the controller 100 can modify the engine operation for model comparison in response to the catalyst aging parameter (616) exceeding the threshold. For example, modifying the engine operation can include at least one of configuring the temperature at the engine outlet, engine-out O2, airflow rate, NOx recirculation (e.g., a portion of the NOx recirculating back to the engine 20), or other engine operations to control NOx exiting the tailpipe. The controller 100 can modify the engine operation to control the inlet gas and outlet concentration of the catalyst.

The controller 100 can compare the difference between the sensor (e.g., measured NOx value downstream of the catalyst) and the model 304 (e.g., predicted NOx value downstream of the catalyst). At process 712, the controller 100 can compare the difference between the measured and predicted values to a threshold. The threshold may be predetermined, such as ±3%, ±5%, or ±7% from the measured value or predicted value. If the difference does not exceeds the threshold, the controller 100 can continue monitoring the catalyst aging parameter (616). If the difference exceeds the threshold, the controller 100 can transmit the data associated with the difference between the measured and predicted value to a sensor-based correction module (e.g., a part of the correction module 116), at process 716.

The 716 can initiate a correction process. The correction process can include correcting the sensor (e.g., NOx sensor 57 or 14) or informing the aging correction module to adjust the model 304 based on the measured value. For example, the 716 can reset the sensor for subsequent measurement. In some cases, the 716 may inform the user of the sensor inaccuracy via a notification, such that the user can perform maintenance on the sensor. In another example, the 716 can transmit data of the difference to the aging correction module. The aging correction module can update the model 304 based on the data. The difference may occur due to the aging or degradation of the catalyst. Accordingly, the aging correction module can update the model 304 to adjust the predicted output based on the measured outlet value associated with NOx conversion efficiency. In some cases, the measured and predicted value may be NH3 value downstream of the catalyst. In some other cases, the 716 can update the model 304 for the aging correction module.

Figure 8:
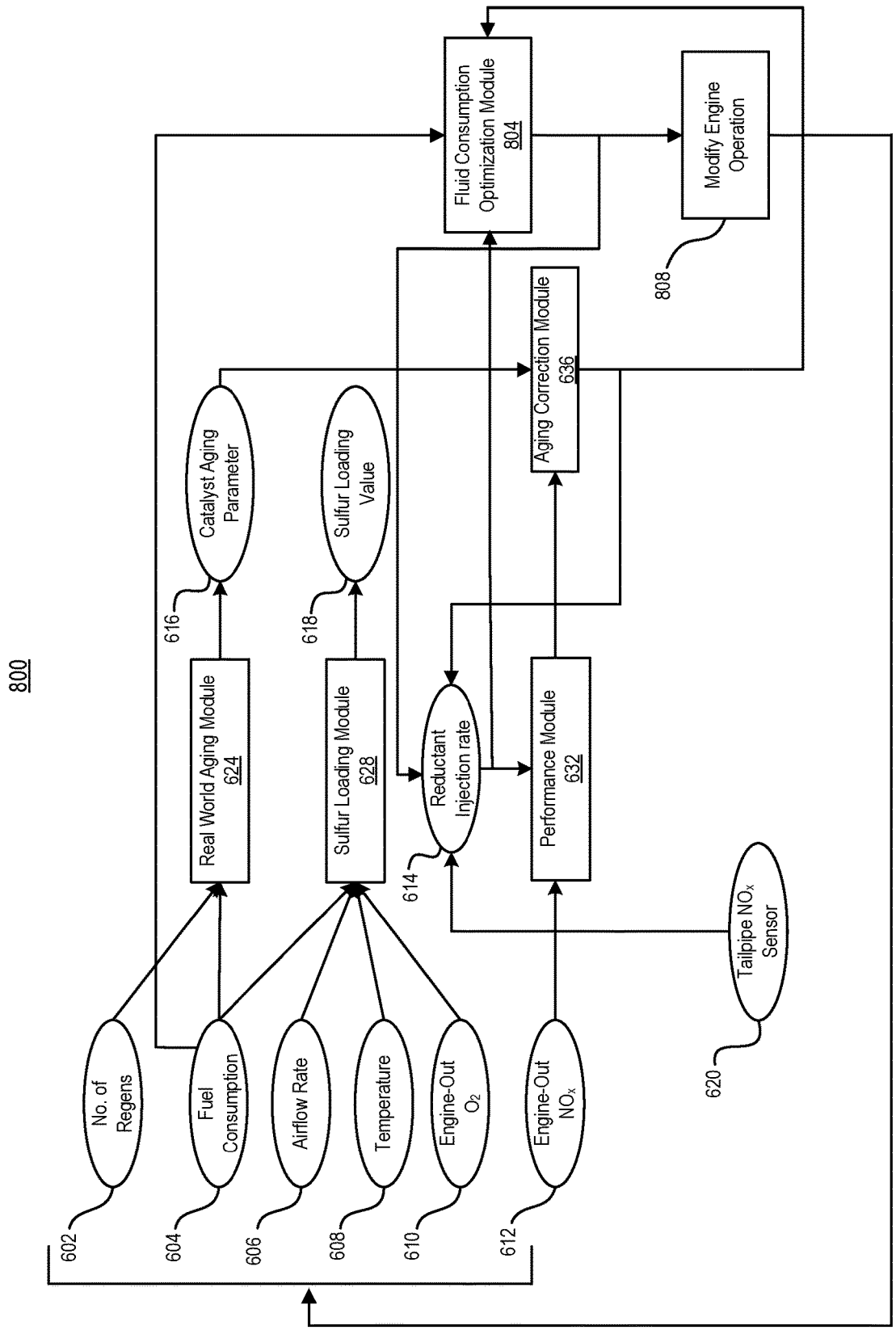
FIG. 8 is a flow diagram for optimizing total fluid consumption of the engine during operation, according to an example embodiment.

Referring to FIG. 8, depicted is a flow diagram 800 for optimizing total fluid consumption of the engine 20 during operation, according to an example embodiment. The one or more operations discussed herein may be performed, executed, or operated by the controller 100, the operator I/O device 120, the one or more circuits of the controller 100, one or more components (e.g., model 304, Kalman filter 308, NH3 storage manager 312, etc.) of the system 300, or other components discussed herein in conjunction with at least FIGS. 1-4A. The certain operation(s) discussed herein may be associated with other operations as described in conjunction with at least FIGS. 6-7.

The controller 100 can obtain the fuel consumption (604) to determine the fluid consumption onboard the vehicle. At process 804, the controller 100 can feed information regarding the fuel consumption (604), reductant injection rate (614), and data (e.g., degradation of the catalyst) from the aging correction module to a fluid consumption optimization module (e.g., a part of the optimization module 117). The fluid consumption optimization module can determine, based on fuel consumption reflecting the amount of NOx released into the exhaust stream, the catalyst performance, and the reductant injection rate, the NOx conversion, NOx slip, or NH3 slip at the tailpipe.

At process 808, in response to the prediction, the fluid consumption optimization module can modify the engine operation. Modifying the engine operation can correspond to, be a part of, or be in addition to process 708. For example, the controller 100 (or the fluid consumption optimization module) can modify at least one of the fuel consumption, airflow rate, temperature, engine-out O2, or engine-out NOx from the engine 20. In some cases, the controller 100 can modify or increase the number of regenerations of the catalyst. By modifying the engine operation, the controller 100 can adjust gas concentration upstream and downstream of the catalyst. Accordingly, the controller 100 can modify the engine operation to optimize fluid consumption to satisfy the NOx amount downstream of the catalyst.

Figure 9:
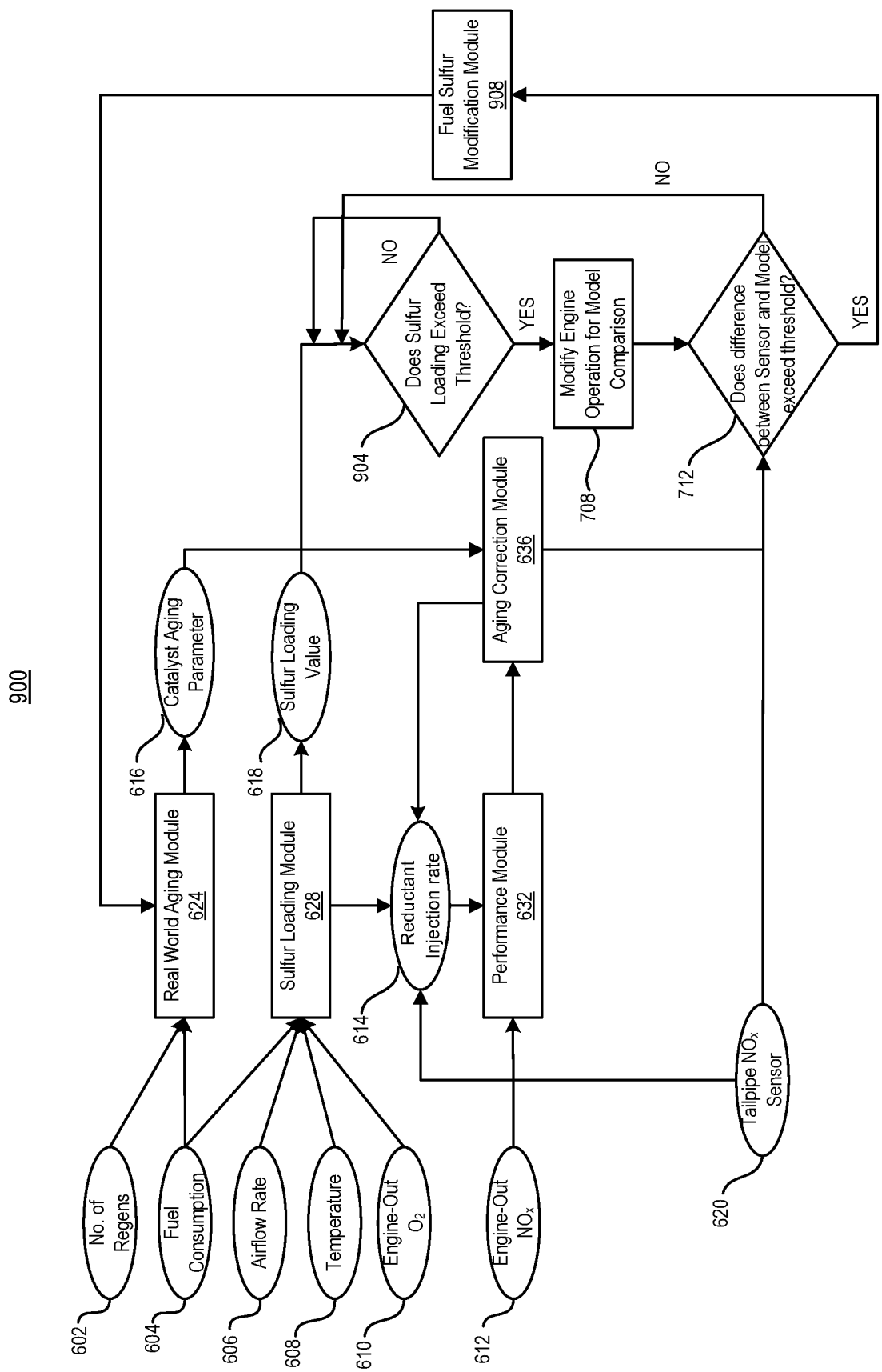
FIG. 9 is a flow diagram for diagnosing high sulfur fuel for the engine operation and one or more components of the aftertreatment system, according to an example embodiment.

Referring to FIG. 9, depicted is a flow diagram 900 for diagnosing high sulfur fuel for the engine operation and one or more components of the aftertreatment system 22, according to an example embodiment. The one or more operations discussed herein may be performed, executed, or operated by the controller 100, the operator I/O device 120, the one or more circuits of the controller 100, one or more components (e.g., model 304, Kalman filter 308, NH3 storage manager 312, etc.) of the system 300, or other components discussed herein in conjunction with at least FIGS. 1-4A. The certain operation(s) discussed herein may be associated with other operations as described in conjunction with at least FIGS. 6-8.

The controller 100 can use the sulfur loading module to determine the sulfur loading value (618). At process 904, the controller 100 can compare and determine whether the sulfur loading value (618) exceeds a threshold (e.g., sulfur loading threshold). The comparison between the sulfur loading value (618) and the threshold can be similar to operation 640, for example. If the sulfur loading value (618) does not exceed the threshold, the controller 100 can continue monitoring changes in the sulfur loading value (618). If the sulfur loading value (618) exceeds the threshold, the controller 100 can modify the engine operation for model comparison, such as at process 708. In response to modifying the engine operation, the controller 100 can determine whether the difference between the sensor and the model 304 exceeds a threshold (e.g., deviation threshold) based on the tailpipe NOx sensor (620) and the modified engine operation, at process 712.

If the difference between the sensor and the model 304 does not exceed the threshold, the controller 100 can continue motoring the changes in sulfur loading value (618). If the difference is greater than the deviation threshold, the controller 100 can transmit data associated with the difference between the sensor and the model 304 to the fuel sulfur modification module (e.g., a part of the optimization module 117), such as at process 908.

In some cases, the fuel sulfur modification module can adjust the model 304 to account for the high sulfur content in the fuel. The high sulfur content can affect the aging or degradation of the catalyst. The fuel sulfur modification module can diagnose high sulfur fuel. For example, the fuel sulfur modification module may increase (or decrease) the hydrocarbon injection in response to determining that the sensor (e.g., the measured value) is not within range of the model 304 (or predicted value). The fuel sulfur modification module can update the model 304 or transmit data to the real-world aging module to adjust the model 304 to account for the sulfur content affecting the aging of the catalyst.

Figure 10:
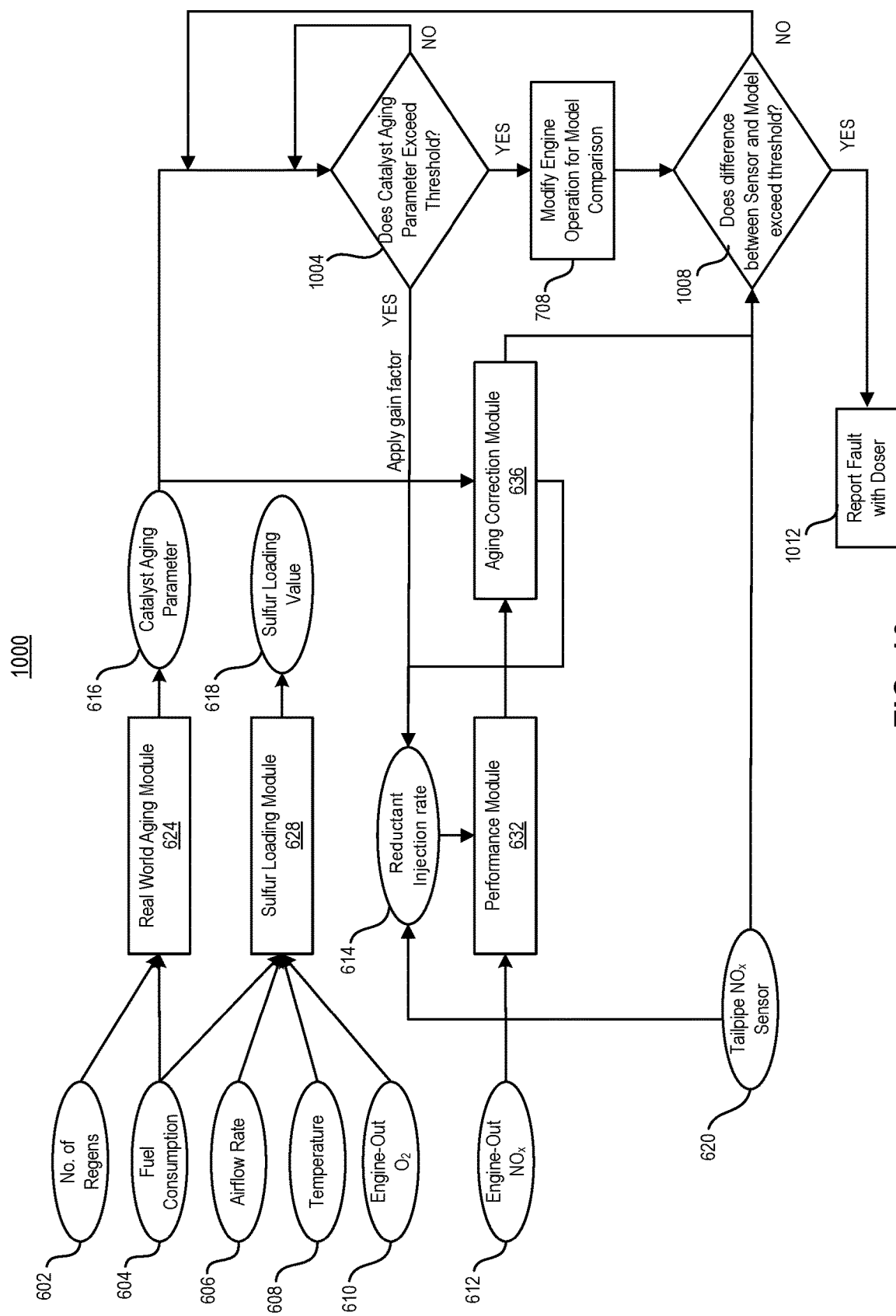
FIG. 10 is a flow diagram for diagnosing a reductant doser failure in an exhaust aftertreatment system, according to an example embodiment.

Referring to FIG. 10, depicted is an example flow diagram 1000 for diagnosing reductant doser failure, according to an example embodiment. The one or more operations discussed herein may be performed, executed, or operated by the controller 100, the operator I/O device 120, the one or more circuits of the controller 100, one or more components (e.g., model 304, Kalman filter 308, NH3 storage manager 312, etc.) of the system 300, or other components discussed herein in conjunction with at least FIGS. 1-4A. The certain operation(s) discussed herein may be associated with other operations as described in conjunction with at least FIGS. 6-9.

At process 1004, subsequent to determining the catalyst aging parameter (616), the controller 100 can determine whether the catalyst aging parameter exceeds a threshold. The determination can be performed similarly to process 648. For example, the controller 100 can continue monitoring the catalyst aging parameter (616) to compare with the threshold in response to determining that the catalyst again parameter (616) does not exceed the threshold. If the catalyst aging parameter (616) exceeds the threshold, the controller 100 can modify the engine operation for model comparison, such as at process 708. In some cases, the controller 100 can apply a gain factor to the reductant injection rate (614) in response to the catalyst aging parameter (616) exceed the threshold. For example, the controller 100 can increase the reductant injection rate in response to the aging of the catalyst exceeding the threshold. The catalyst aging parameter may indicate a magnitude of catalyst performance degradation.

Subsequent to modifying the engine operation, the controller 100 can determine whether the difference between the sensor and the model 304 exceeds a deviation threshold, at process 1008. The comparison between the sensor and the model 304 can be similar to process 712. If the difference does not exceed the threshold, the controller 100 can continue monitoring the catalyst aging parameter (616). At process 1012, if the difference exceeds the deviation threshold, the controller 100 can report a fault with the doser 56. For example, the controller 100 may determine the difference the sensor and the model after updating the model 304 or updating the reductant injection rate to meet the predicted value (e.g., predicted or desired NOx value). If the delta of the measured value and the predicted value exceeds the deviation threshold, the controller 100 may determine that there is a fault with the doser 56. A doser fault may include an inaccuracy of dosage injection (e.g., timing or duration), lack of DEF supply, or other faults for supplying reductant to the exhaust stream. The controller 100 can report the fault via the operator I/O device 120 to the user or an administrator, for example.

Figure 11:
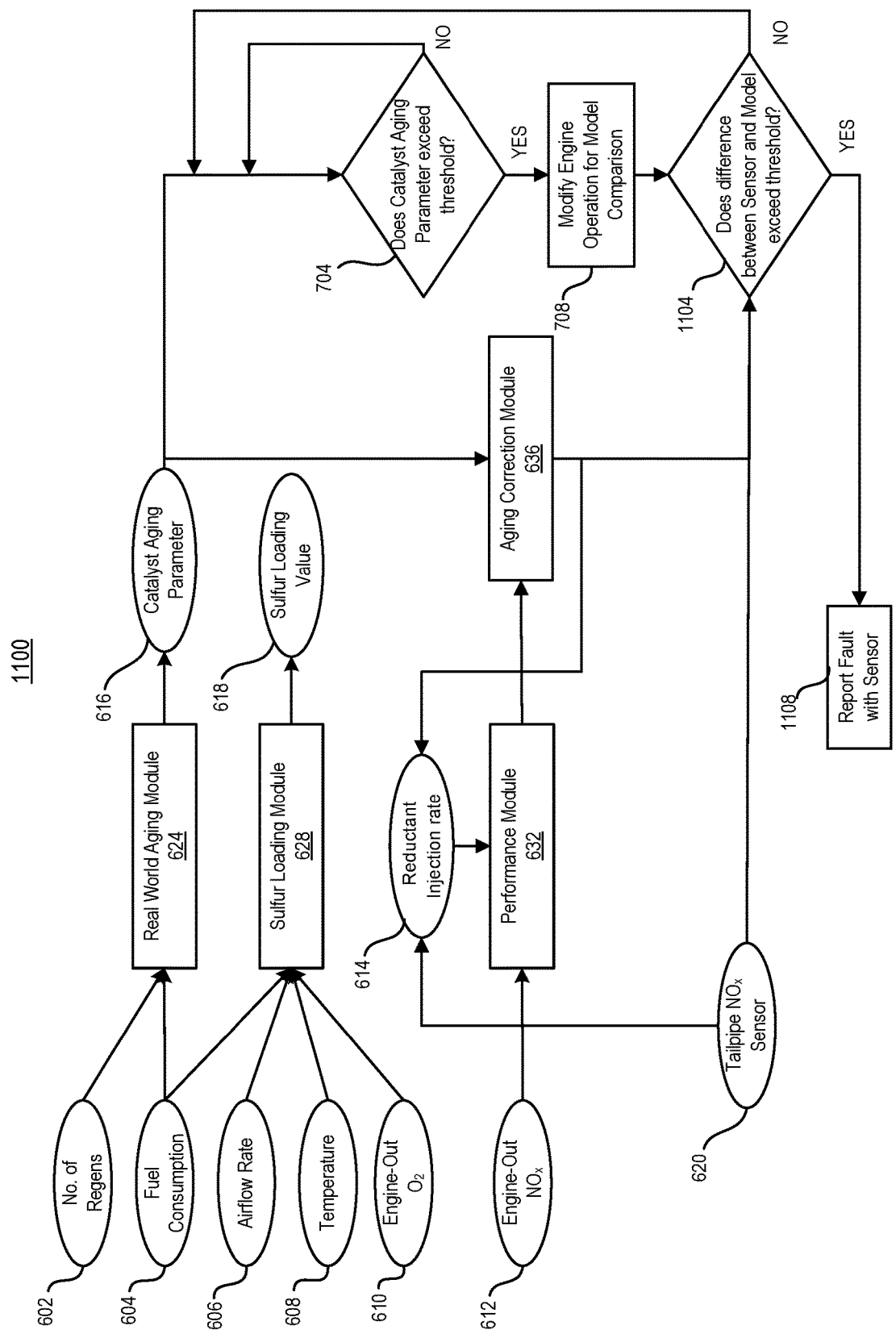
FIG. 11 is a flow diagram for diagnosing a sensor failure in a system, such as the system of FIG. 1, according to an example embodiment.

Referring to FIG. 11, depicted is an example flow diagram 1100 for diagnosing sensor failure, according to an example embodiment. The one or more operations discussed herein may be performed, executed, or operated by the controller 100, the operator I/O device 120, the one or more circuits of the controller 100, one or more components (e.g., model 304, Kalman filter 308, NH3 storage manager 312, etc.) of the system 300, or other components discussed herein in conjunction with at least FIGS. 1-4A. The certain operation(s) discussed herein may be associated with other operations as described in conjunction with at least FIGS. 6-10.

In some implementations, the controller 100 can diagnose the sensor failure based on a comparison between the sensed NOx value and predicted NOx value (e.g., a value downstream of the catalyst, such as the SCR catalyst). In some cases, the sensed value and the predicted value may be NH3 values. For example, the controller 100 can determine the difference between the sensor (e.g., measured value) and the model 304 (e.g., predicted value). At process 1104, the controller 100 can determine whether the difference between the sensor and the model 304 exceeds a predefined deviation threshold. The determination may be similar to process 712, at least in part. If the difference does not exceed the threshold, the controller 100 can continue monitoring the catalyst aging parameter (616).

In some cases, the controller 100 can determine that the difference between the sensor and the model 304 exceeds the threshold. At process 1108, if response to the determination, the controller 100 can report a fault with the sensor (e.g., tailpipe NOx sensor or NOx sensor 57 or 14). For example, the controller 100 may analyze the sensor measurement throughout the degradation of the catalyst, changes to the engine operation, aging correction, or modification to the reductant injection rate. The controller 100 can determine whether the measured values from the sensor are within the expected range based on one or more input data to the model 304. In some cases, the controller 100 can change the NOx production from the engine 20 or the reductant injection rate to test the sensor measurement. Accordingly, if the sensor and the model 304 still exceed the threshold after the modification to the engine operation or reductant dosage, or if the measurement data is not within the expected range determined by the model 304, the controller 100 can report a fault with the sensor.

Figure 12:
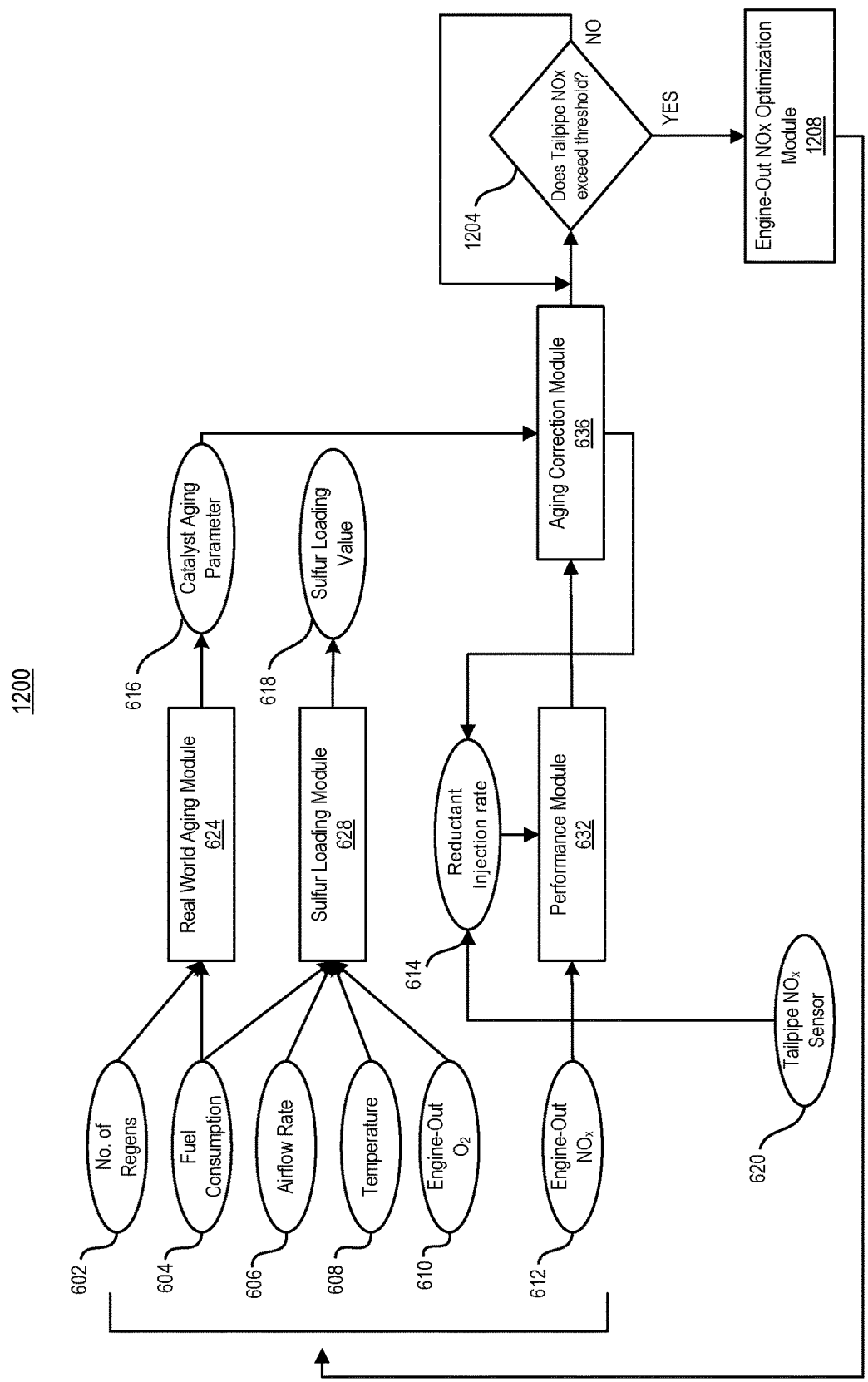
FIG. 12 is a flow diagram for optimizing engine operation in a system, such as the system of FIG. 1, according to an example embodiment.

Referring to FIG. 12, depicted is a flow diagram 1200 for optimizing engine operation, according to an example embodiment. The one or more operations discussed herein may be performed, executed, or operated by the controller 100, the operator I/O device 120, the one or more circuits of the controller 100, one or more components (e.g., model 304, Kalman filter 308, NH3 storage manager 312, etc.) of the system 300, or other components discussed herein in conjunction with at least FIGS. 1-4A. The certain operation(s) discussed herein may be associated with other operations as described in conjunction with at least FIGS. 6-11.

At process 636, the controller 100 can provide the catalyst aging parameter (616) (e.g., information regarding the catalyst aging parameter) to the aging correction module to predict NOx value at the tailpipe based on the aging of the catalyst. At process 1204, the controller 100 can determine whether the tailpipe NOx exceeds a threshold (e.g., NOx value threshold downstream of the catalyst). The tailpipe NOx may be a predicted value or a measured value by the tailpipe NOx sensor. If the tailpipe NOx does not exceed the threshold, the controller 100 can continue monitoring or predicting subsequent NOx values downstream of the catalyst.

At process 1208, if the tailpipe NOx exceeds the threshold, the controller 100 can trigger or provide instructions to the engine-out NOx optimization module (e.g., part of the optimization module 117). The controller 100 can use the engine-out NOx optimization module to control NOx concentration, volume, or amount from the engine 20. In some cases, the engine-out NOx optimization module can control the NOx amount downstream of the catalyst. For example, the controller 100 using the engine-out NOx optimization module can initiate active regeneration of the catalyst or particulate filter to improve NOx conversion, or configure the fuel consumption, airflow rate, temperature, engine-out O2, engine-out NOx, or NOx recirculation. By adjusting one or more components to control engine-out NOx, the controller 100 can optimize at least NOx conversion and reduce a tailpipe NOx outlet amount.

Figure 13:
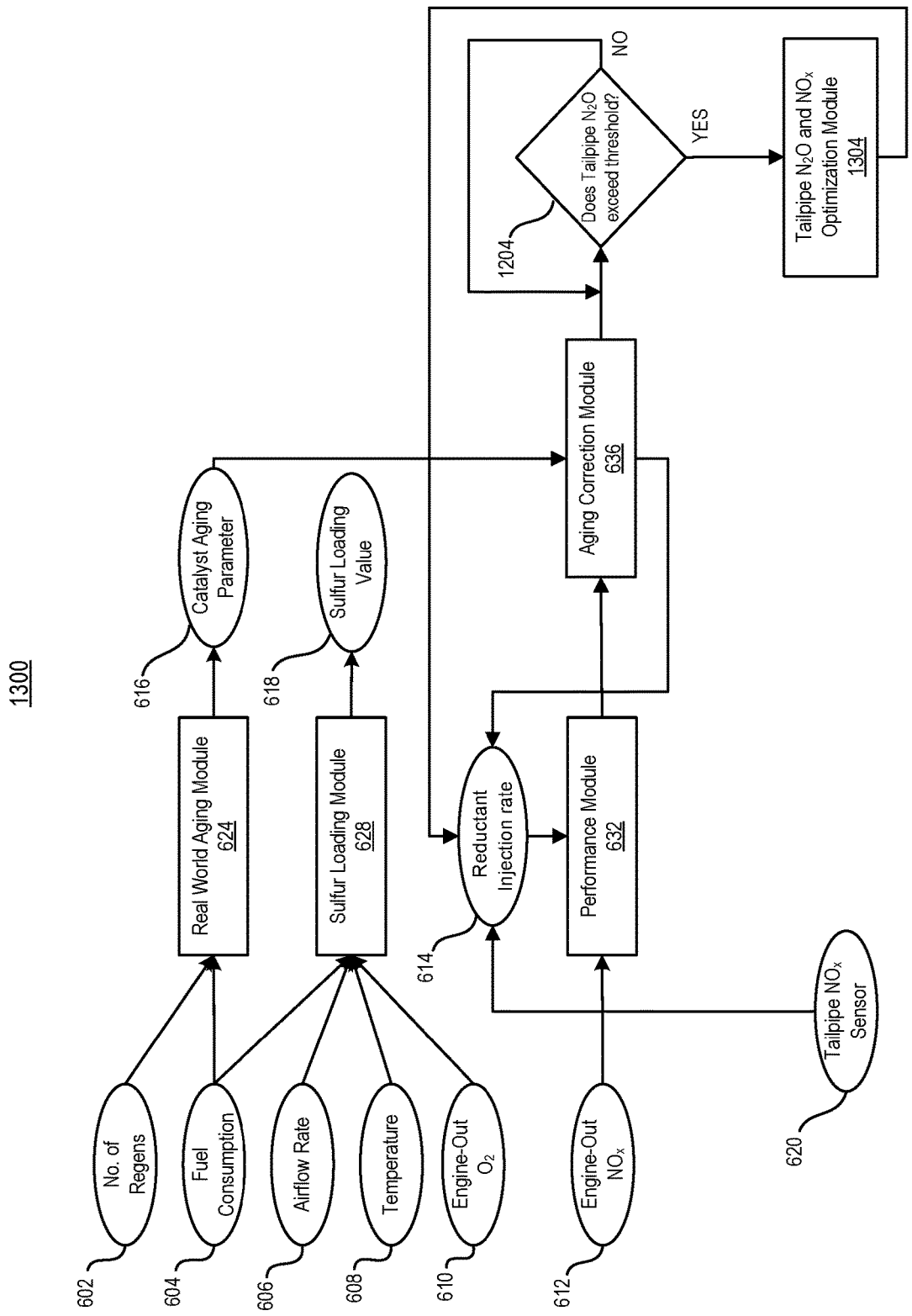
FIG. 13 is a flow diagram for optimizing NOx and nitrous oxide (N2O) slip in an exhaust aftertreatment system, according to an example embodiment.

Referring to FIG. 13, depicted is an example flow diagram 1300 for optimizing NOx and nitrous oxide (N2O) slip, according to an example embodiment. The one or more operations discussed herein may be performed, executed, or operated by the controller 100, the operator I/O device 120, the one or more circuits of the controller 100, one or more components (e.g., model 304, Kalman filter 308, NH3 storage manager 312, etc.) of the system 300, or other components discussed herein in conjunction with at least FIGS. 1-4A. The certain operation(s) discussed herein may be associated with other operations as described in conjunction with at least FIGS. 6-12.

In some implementations, the controller 100 can monitor N2O at the tailpipe corrected for the aging of the catalyst using the aging correction module. The controller 100 can determine whether the tailpipe N2O exceeds a threshold (e.g., N2O threshold) (1204). If the N2O concentration, volume, or amount does not exceed the threshold, the controller 100 can continue monitoring the N2O at a portion downstream of the catalyst. At process 1304, if the tailpipe N2O exceed the threshold, the controller 100 can provide data or trigger a tailpipe N2O and NOx optimization module (e.g., part of the optimization module 117) to optimize the N2O or NOx slip. The tailpipe N2O and NOx optimization module can update the reductant injection rate (614) to optimize the slippage of N2O and NOx.

For example, the controller 100 can use tailpipe N2O and NOx optimization module to identify the magnitude of N2O or NOx at the tailpipe and the rate or duration of reductant injection to reduce the N2O or NOx slip. In response to determining the rate of reductant injection, the controller 100 can update the doser 56 to adjust the reductant dosage. For example, the controller 100 can increase the reductant dosage by a first amount based on a first tailpipe N2O value exceeding the threshold. In another example, the controller 100 can increase the reductant dosage by a second amount (e.g., greater than the first amount) based on a second tailpipe N2O value greater than the first tailpipe N2O value. The performance module can track the performance of the catalyst (e.g., NOx conversion) based on the updated reductant injection rate and the engine-out NOx. The aging correction module can receive data from the performance module including, for example, at least the catalyst performance and tailpipe gas concentration (e.g., NOx, N2O, etc.) to update the model 304. The controller 100 can use the model 304 to determine the tailpipe NOx and N2O based on at least the performance of the catalyst, the reductant injection rate, and engine-out NOx corrected for aging. In some cases, the controller 100 can use the performance module and the aging correction module or information from the modules to update the model 304 to predict gas concentration downstream of the catalyst.

Figure 14:
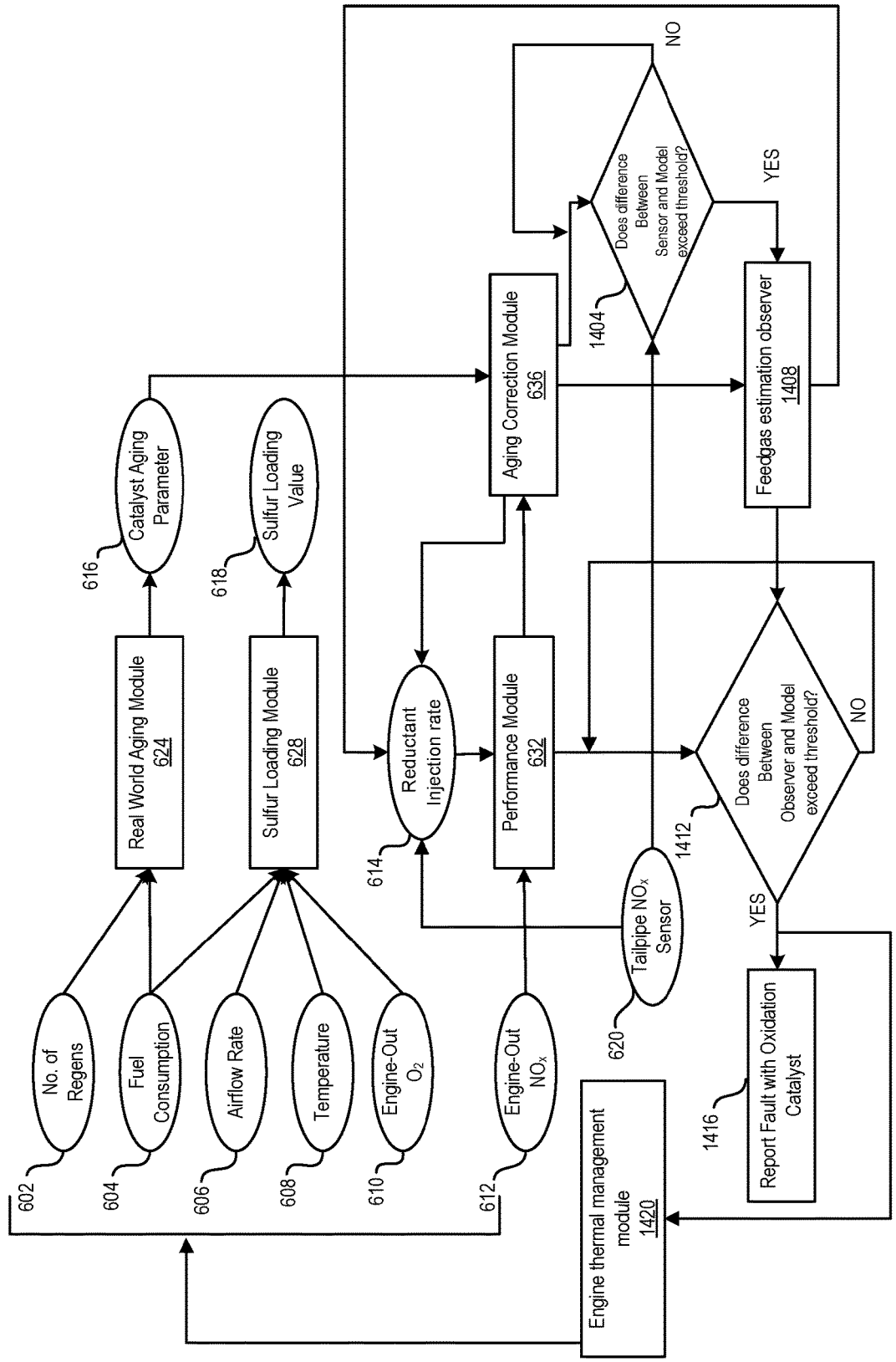
FIG. 14 is a flow diagram for diagnosing oxidation catalyst failure in an exhaust aftertreatment system, according to an example embodiment.

Referring to FIG. 14, depicted is an example flow diagram 1400 for diagnosing oxidation catalyst failure, according to an example embodiment. The one or more operations discussed herein may be performed, executed, or operated by the controller 100, the operator I/O device 120, the one or more circuits of the controller 100, one or more components (e.g., model 304, Kalman filter 308, NH3 storage manager 312, etc.) of the system 300, or other components discussed herein in conjunction with at least FIGS. 1-4A. The certain operation(s) discussed herein may be associated with other operations as described in conjunction with at least FIGS. 6-13.

The controller 100 can diagnose oxidation catalyst (e.g., DOC catalyst 30 failure). For example, the controller 100 can observe the reductant injection rate (614) and the tailpipe NOx sensor (620). The observation of the measured NOx value at the tailpipe (or downstream of the SCR catalyst 50) and the reductant dosage may be referred to as observer sensed NOx value. The controller 100 can compare between an observation of the tailpipe NOx sensor and the model 304 indicating the predicted NOx value downstream of the SCR catalyst 50 provided by the aging correction module. At process 1404, the controller 100 can determine whether the difference between the sensed tailpipe NOx value and the model 304 (e.g., predicted NOx value) exceeds a first threshold. The first threshold may be configured by the administrator of the controller 100 or determined by the model 304, such as similar to other threshold configurations. The difference the sensed NOx value and predicted NOx value may be referred to as a first difference.

If the first difference does not exceed the first threshold, the controller 100 can continue monitoring the measured and predicted values, such as changes in reductant injection rate or tailpipe NOx value). At process 1408, if the first difference is greater than the first threshold, the controller 100 may trigger a feed gas estimation observer. The feed gas estimation observer may be a module, a device, or a component local or external to the controller 100. The feed gas estimation observer can receive data from the aging correction module to correct for the aging of one or more components of the aftertreatment system 22. The feed gas estimation observer can be configured to estimate or determine one or more gas concentrations fed to or upstream of the SCR catalyst 50 or downstream of the DOC catalyst 30 based on at least one of the engine-out NOx (612) or the reductant injection rate (614). In some cases, the feed gas estimation observer can determine gas concentration upstream of the DOC catalyst 30. The controller 100 can use the feed gas estimation observer to predict the gas concentration inlet of the SCR catalyst 50. The feed gas estimation observer (or data of the feed gas estimation observer) may be a part of the model 304.

The controller 100 can compare the predicted data of the model 304 (e.g., from the feed gas estimation observer) to an observation from the performance module. The observation from the performance module may be referred to as an observer. The observer can include, indicate, or provide at least measured engine-out NOx or reductant injection rate (e.g., adjusted for tailpipe NOx measurement) upstream of the SCR catalyst 50. At process 1412, the controller 100 can determine whether a difference between the observer and the model 304 (e.g., predicted upstream gas concentration) exceeds a second threshold. The second threshold may be configured by the administrator of the controller 100 or determined by the model 304, such as similar to other threshold configurations. The first threshold and the second threshold may be referred to as a first deviation threshold and a second deviation threshold. By comparing the observer to the model 304, the controller 100 can determine whether the intake gas concentration is within prediction accounting for the performance of the oxidation catalyst (or other catalysts). In this case, the difference may be referred to as a second difference.

If the second difference does not exceed the threshold, the controller 100 can continue monitoring data from the performance module and feed gas estimation observer, such as upstream values. If the second difference exceeds the threshold, the controller 100 can determine a fault with the oxidation catalyst, which causes the inaccuracy in the second observation. Accordingly, the controller 100 can report a fault with the oxidation catalyst, at process 1416. At process 1420, the controller 100 can inform an engine thermal management module to manage the engine thermal. The engine thermal management module may be a part of an optimization module 117 or the model 304, for example. The controller 100 can inform the engine thermal management module subsequent to, concurrent to, or prior to reporting the fault. For example, the engine thermal management module may decrease the temperature of the engine 20 (or at the outlet of the engine 20) to reduce at least one type of gas concentration from releasing into the exhaust stream. The engine thermal management module can configure other engine operations or components of the aftertreatment system 22, such as fuel consumption, airflow rate, temperature, etc. Therefore, the controller 100 can use the engine thermal management module to regulate certain gas slip (e.g., NOx slip or NH3 slip) during oxidation catalyst failure.

Figure 15:
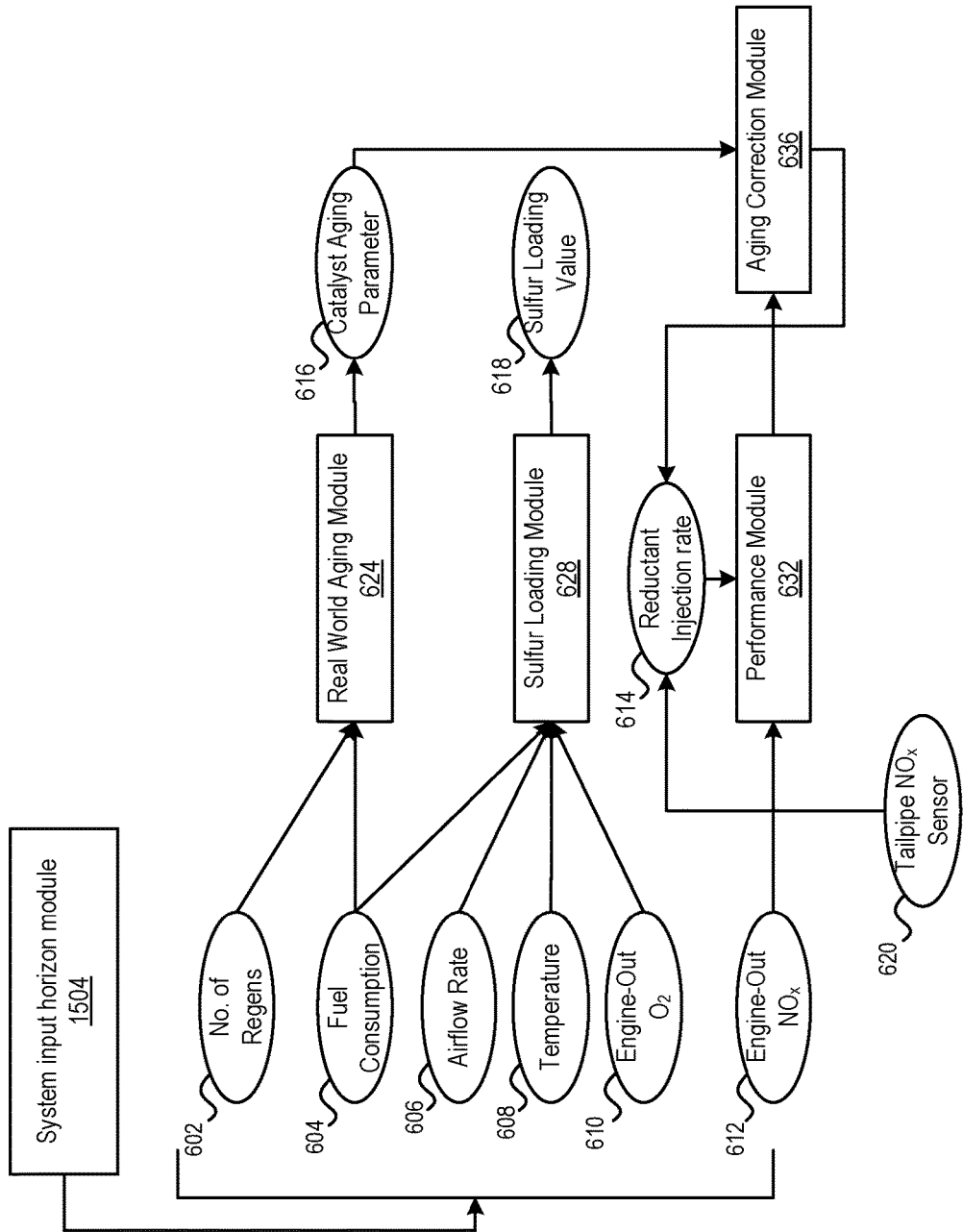
FIG. 15 is a flow diagram for implementing predictive control of reductant dosing with the controller of FIGS. 1-2, according to an example embodiment.

Referring to FIG. 15, depicted is a flow diagram 1500 for predictive control of reductant dosing, according to an example embodiment. The one or more operations discussed herein may be performed, executed, or operated by the controller 100, the operator I/O device 120, the one or more circuits of the controller 100, one or more components (e.g., model 304, Kalman filter 308, NH3 storage manager 312, etc.) of the system 300, or other components discussed herein in conjunction with at least FIGS. 1-4A. The certain operation(s) discussed herein may be associated with other operations as described in conjunction with at least FIGS. 6-14.

In some implementations, at process 1504, the controller 100 can use a system input horizon module to adjust, modify, or update one or more input data (e.g., number of regenerations (602), fuel consumption (604), airflow rate (606), temperature (608), engine-out O2 (610), engine-out NOx (612), etc.). The system input horizon module may be a part of the modeling circuit 110, one or more modules of the controller 100, model 304, or other models. The system input horizon module includes one or more methods, operations, or procedures to adjust the reductant delivery based on predictions of future system inputs, such as vehicle navigation system, vehicle traffic information, engine speed, fuel consumption, among others. The system input horizon module further adjusts the reductant delivery based on the corresponding impact of the predicted system inputs on the system performance using at least performance module and/or aging correction module, for example.

The controller 100 can use the system input horizon module to estimate engine operation points based on one or more of the predicted system inputs. Based on the engine operation, the system input horizon module predicts or determines catalyst performance and aging state. The controller 100 (utilizing the system input horizon module) uses the performance and engine aging prediction, estimate, or determination to predict and modify future reductant dosing rates.

In further example, as shown in FIG. 15, the controller 100 can collect or retrieve historical data of the performance of one or more catalysts corrected for aging, input (e.g., inlet gas concentration) into individual catalysts, output (e.g., outlet gas concentration) from individual catalysts, operations of the engine 20, and operation of one or more components of the aftertreatment system 22 (e.g., doser 56, DEF source 54, etc.). The controller 100 can provide the historical data to a model 304 to predict at least a tailpipe NOx value based on a first configuration of the engine 20 (e.g., fuel consumption, airflow rate, etc.). If the tailpipe NOx value satisfied the desired output value or does not exceed a NOx slip threshold, the controller 100 using the system input horizon module can maintain the first configuration. Otherwise, the controller 100 using the system input horizon module can modify at least one operation of the engine 20 to satisfy the desired output value.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 102 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer (such as via the controller 100 of FIGS. 1 and 2), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
an aftertreatment system; and
a controller coupled to the aftertreatment system, the controller configured to:
retrieve, from a memory, a model of a catalyst of the aftertreatment system generated based on at least historical data from at least one sensor upstream of the catalyst and at least one sensor downstream of the catalyst;
predict, using the model, a first value sensed by the sensor upstream of the catalyst and a second value sensed by the sensor downstream of the catalyst; and
control reductant dosing from a doser based on the predicted second value, wherein the historical data comprises an operation time of the catalyst, a number of regenerations of the catalyst, a plurality of values from the sensor upstream of the catalyst during the operation time, and a plurality of values from the sensor downstream of the catalyst during the operation time.

2. The system of claim 1, wherein the first value is indicative of an amount of nitrogen oxides (NOx) upstream of the catalyst, and wherein the second value is indicative of an amount of NOx downstream of the catalyst or an amount of reductant downstream of the catalyst.

3. The system of claim 1, wherein the historical data from the sensor upstream of the catalyst comprises temperature data, fuel consumption data, and prediction data, wherein the prediction data comprises at least one of NOx data or Oxygen (O2) data.

4. The system of claim 1, wherein the controller is configured to:
increase the reductant dosing from the doser in response to the operation time being greater than a first threshold, or
increase the reductant dosing from the doser in response to the number of regenerations being greater than a second threshold.

5. The system of claim 1, wherein the controller is configured to:
decrease, in response to a regeneration of the catalyst, the reductant dosing from the doser based on the operation time and the number of regenerations of the catalyst.

6. The system of claim 1, wherein the controller is configured to:
initiate, in response to the operation time of the catalyst exceeding a threshold, a process to recover the catalyst; and
adjust, in response to at least partly recovering the catalyst, the model to predict a third value sensed by the sensor downstream from the catalyst.

7. The system of claim 1, wherein the catalyst is a Selective Catalytic Reduction (SCR) catalyst.

8. The system of claim 1, wherein the model comprises a channel based on the catalyst comprising a plurality of sections, and wherein the controller is configured to:
predict, for each of the plurality of sections of the channel, a value of a continuously stirred tank reactor (CSTR), the value indicative of a NOx conversion efficiency.

9. The system of claim 1, wherein to control the reductant dosing, the controller is configured to:
control the reductant dosing from the doser at a future time period based on the predicted second value;
identify, at the future time period, a third value sensed by the sensor downstream of the catalyst; and
adjust, based on at least the historical data and a comparison between the third value to a threshold, the model to control the reductant dosing from the doser.

10. A method, comprising:
retrieving, by a controller coupled to an aftertreatment system and from a memory, a model of a catalyst of the aftertreatment system generated based on at least historical data from at least one sensor upstream of the catalyst and at least one sensor downstream of the catalyst;

predicting, by the controller using the model, a first value sensed by the sensor upstream of the catalyst and a second value sensed by the sensor downstream of the catalyst; and controlling, by the controller, reductant dosing from a doser based on the predicted second value, wherein the historical data comprises an operation time of the catalyst, a number of regenerations of the catalyst, a plurality of values from the sensor upstream of the catalyst during the operation time, and a plurality of values from the sensor downstream of the catalyst during the operation time.

11. The method of claim 10, wherein the first value is indicative of an amount of nitrogen oxides (NOx) upstream of the catalyst, and wherein the second value is indicative of an amount of NOx downstream of the catalyst or an amount of the reductant downstream of the catalyst.

12. The method of claim 10, the method further comprising:

increasing, by the controller, the reductant dosing from the doser in response to an operation time of the catalyst being greater than a first threshold, or increasing, by the controller, the reductant dosing from the doser in response to a number of regeneration events of the catalyst being greater than a second threshold.

13. The method of claim 10, the method further comprising:

decreasing, by the controller and, the reductant dosing from the doser based on an operation time of the catalyst and a number of regeneration events of the catalyst.

14. A system, comprising:

at least one processing circuit comprising at least one memory coupled to at least one processor, the at least one processing circuit configured to:

predict, using a model of a catalyst of an aftertreatment system generated based on at least historical data from at least one sensor upstream of the catalyst and at least one sensor downstream of the catalyst, a first value sensed by the sensor upstream of the catalyst and a second value sensed by the sensor downstream of the catalyst, wherein the historical data comprises an operation time of the catalyst, a number of regenerations of the catalyst, a plurality of values from the sensor upstream of the catalyst during the operation time, and a plurality of values from the sensor downstream of the catalyst during the operation time;

receive a third value sensed by the sensor downstream of the catalyst;

determine a fault with a doser responsive to a comparison between the second value and the third value exceeding a threshold; and provide, responsive to the determination, an indication of the fault to an operator device.

15. The system of claim 14, wherein the first value is indicative of an amount of nitrogen oxides (NOx) upstream of the catalyst, wherein the second value is indicative of an amount of NOx downstream of the catalyst or a predicted amount of reductant downstream of the catalyst, and wherein the third value is indicative of an actual amount of NOx downstream of the catalyst.

16. The system of claim 14, wherein the historical data from the sensor upstream of the catalyst comprises temperature data, fuel consumption data, and prediction data, wherein the prediction data comprises at least one of NOx data or Oxygen (O2) data.

17. The system of claim 14, wherein the at least one processing circuit is configured to:

control reductant dosing from the doser based on the predicted second value, wherein controlling the reductant dosing comprises:

increasing the reductant dosing from the doser in response to the operation time being greater than a first threshold, or increasing the reductant dosing from the doser in response to the number of regenerations being greater than a second threshold.

18. The system of claim 14, wherein in response to the comparison between the second value and the third value being below the threshold, the at least one processing circuit is configured to:

control reductant dosing from the doser based on the predicted second value by applying a gain factor to a reductant dosing rate.

19. The system of claim 9, wherein to control the reductant dosing from the doser, the controller is configured to:

apply a gain factor to a reductant dosing rate.

20. The system of claim 14, wherein the at least one processor is configured to:

decrease, in response to a regeneration of the catalyst, reductant dosing from the doser based on the operation time and the number of regenerations of the catalyst.

\* \* \* \* \*